US006971065B2

(12) United States Patent
Austin

(10) Patent No.: US 6,971,065 B2
(45) Date of Patent: Nov. 29, 2005

(54) AUTOMATICALLY CONFIGURING A GRAPHICAL PROGRAM TO PUBLISH OR SUBSCRIBE TO DATA

(75) Inventor: Paul F. Austin, Austin, TX (US)

(73) Assignee: National Instruments Corporation, Austin, TX (US)

( * ) Notice: Subject to any disclaimer, the term of this patent is extended or adjusted under 35 U.S.C. 154(b) by 541 days.

(21) Appl. No.: 09/737,528

(22) Filed: Dec. 13, 2000

(65) Prior Publication Data

US 2002/0070966 A1 Jun. 13, 2002

(51) Int. Cl.7 ............................ G06F 3/00; G06F 9/00; G06F 17/00; G06F 9/44; G06F 15/16

(52) U.S. Cl. ........................ 715/763; 717/109; 709/217

(58) Field of Search ................................ 345/763, 734, 345/771, 967, 970, 755, 758, 738, 748; 717/109, 717/113; 709/217, 219; 700/18; 715/762

(56) References Cited

U.S. PATENT DOCUMENTS

| | | | | |
|---|---|---|---|---|
| 5,291,587 A * | 3/1994 | Kodosky et al. | 703/2 |
| 5,339,392 A * | 8/1994 | Risberg et al. | 345/762 |
| 5,617,522 A * | 4/1997 | Peltier | 345/763 |
| 5,818,446 A | 10/1998 | Bertram et al. | |
| 5,861,882 A * | 1/1999 | Sprenger et al. | 345/700 |
| 5,959,621 A * | 9/1999 | Nawaz et al. | 345/733 |
| 6,016,143 A * | 1/2000 | Heinzman | 345/837 |
| 6,229,534 B1 | 5/2001 | Gerra et al. | |
| 6,366,300 B1 * | 4/2002 | Ohara et al. | 345/771 |
| 6,370,569 B1 | 4/2002 | Austin | |
| 6,425,121 B1 | 7/2002 | Phillips | |
| 6,560,557 B1 | 5/2003 | Carnahan et al. | |
| 6,763,395 B1 | 7/2004 | Austin | |

OTHER PUBLICATIONS

Boodey, D., Moseley, L. "Mastering Microsoft Office 97, Professional Edition." pp. 33-52, 379-395. SYBEX Inc. 1997.*

Austin, et al., U.S. Appl. No. 09/374,740 titled, "System and Method for Automatically Creating URLs for Accessing Data Sources and Data Targets" filed on Aug. 13, 1999.

* cited by examiner

*Primary Examiner*—John Cabeca
*Assistant Examiner*—Blaine Basom
(74) *Attorney, Agent, or Firm*—Meyertons Hood Kivlin Kowert & Goetzel, P.C.; Jeffrey C. Hood; Jason L. Burgess

(57) ABSTRACT

A system and various methods for simplifying or automating the task of configuring a graphical program to exchange data with a data source and/or data target. In response to receiving user input specifying a data source, the graphical program may be automatically, i.e., programmatically, configured to receive data from the data source. In response to receiving user input specifying a data target, the graphical program may be automatically, i.e., programmatically, configured to provide or write data to the data target. The data source or data target may be any of various types. For example, the data source or data target may be a file, a server, etc., and may be located on the host computer system of the graphical program or on a remote computer system. In the preferred embodiment, the data source or data target is specified by a uniform resource locator (URL).

6 Claims, 24 Drawing Sheets

AUTOMATICALLY CONFIGURING A GRAPHICAL PROGRAM TO PUBLISH OR SUBSCRIBE TO DATA

FIELD OF THE INVENTION

The present invention relates to the field of graphical programming, and more particularly to a system and method for configuring a graphical program to publish data or subscribe to data, e.g., for exchanging data with a data target or data source external to the graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc. The method disclosed in Kodosky et al allows a user to construct a diagram using a block diagram editor, such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer. Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a graphical "program." A graphical program for measuring, controlling, or modeling devices, such as instruments, processes or industrial automation hardware, may be referred to as a virtual instrument (VI). In creating a virtual instrument, a user may create a front panel or user interface panel. The front panel may include various user interface elements or front panel objects, such as controls or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects may be embedded in the block diagram.

During creation of the graphical program, the user may select various function nodes or icons that accomplish his desired result and connect the function nodes together. For example, the function nodes may be connected in one or more of a data flow, control flow, and/or execution flow format. The function nodes may be connected between the terminals of the respective controls and indicators. Thus the user may create or assemble a graphical program, referred to as a block diagram, graphically representing the desired process. The assembled graphical program may then be compiled or interpreted to produce machine language that accomplishes the desired method or process as shown in the block diagram.

A user may input data to a virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others.

Computer programs, including graphical programs, are often required to exchange data with a data source or data target external to the program. In various applications, a program may write or provide data of any of various types to any of various types of data targets. Also, in various applications, a program may receive data of any of various types from any of various types of data sources. For example, data may be received from a data source such as a file or from a server, such as an FTP or HTTP server. The data may comprise static data, such as pre-stored data in a file, or live data, such as data streamed in real time by a server. The data may also originate from another program or process running on the host computer system or a remote computer system. For example, a program for processing live weather data may utilize data received from a remote computer system that senses weather-related variables, such as temperature, wind speed, humidity, etc., and transduces these variables into data that the program can use.

As well known in the art, exchanging data with data sources or data targets external to a program is often difficult to implement. For example, consider the program described above for processing weather data, wherein a client computer system that executes a client program is connected over a TCP/IP network to a server computer that generates the data. In order for the client program to receive the data from the server computer, the TCP protocol would typically be used, which may involve several steps, such as:

choosing a TCP/IP port number not in use by any other applications defining the application-level protocol (e.g., what gets sent when)

configuring the server computer to listen on the selected port and create a connection when the client program initiates a request configuring the server computer to marshal the data and write to all connections configuring the client program to connect to the selected port and unmarshal the data managing any errors This list only provides an overview of the complexity involved in receiving the data. Thus, this scenario illustrates several details that many graphical program developers would not have the necessary skill to deal with or would prefer not to deal with. Therefore, it would be desirable to provide a system and method to simplify the task of implementing data exchange for a graphical program.

Ideally, such a system and method would be independent of the type of data source or data target. For example, in the prior art, receiving data from a file would typically require the developer to code a different set of steps than if data were received from a remote server, as described in the above example. For example, the developer may need to program the steps of opening the file, reading data from the file, closing the file, etc. It would be desirable, for example, for a method of configuring a graphical program to receive waveform data from a local file to be the same or substantially the same as a method of configuring the graphical program to receive live waveform data generated by a remote application.

It would also be desirable for the system and method to be independent of the platform on which the program runs. Different computing platforms support different mechanisms for data exchange. For example, a Windows program may use DDE or ActiveX/COM, whereas programs running on other platforms use different mechanisms. In typical cases, graphical program developers would prefer to not concern themselves with platform-specific issues.

In many applications, data received from a data source or provided to a data target may be associated with a graphical user interface (GUI) element. Graphical user interfaces (GUIs) enable users to interact with computer programs in an intuitive manner, utilizing various types of GUI elements. Different graphical programming environments may enable developers to include any of various types of GUI elements in a graphical program's graphical user interface or front panel. For example, FIGS. 1 and 2 (prior art) illustrate several GUI elements, including GUI elements that may be used in instrumentation or measurement applications. FIG. 1 (prior art) illustrates an exemplary front panel for a measurement graphical program for computing the averaged power spectrum of a simulated input signal. For example, the front panel includes a knob GUI element for adjusting the frequency of the simulated signal and a chart GUI element for displaying a chart of the power spectrum. FIG. 2 (prior art) illustrates additional examples of GUI elements useful for instrumentation or measurement applications, e.g., a thermometer, an LED, a meter, a waveform chart, a tank, etc. Other types of GUI elements that may be included in a graphical user interface or front panel include text boxes, check boxes, etc.

GUI elements may be configured to indicate data to the user, e.g., by displaying the data on a display screen. For example, the Power Spectrum chart on the user interface panel of FIG. 1 displays a chart of the averaged power spectrum computed by the graphical program. GUI elements may also be configured to provide user input to a graphical program. For example, when the value of the Frequency knob on the user interface panel of FIG. 1 changes, e.g., due to a user interactively turning the knob, the graphical program may detect this change in value, e.g., by intercepting an event triggered when the value changes, and may respond by changing the signal that is generated in accordance with the new frequency value.

As described above, in many cases, it may be desirable for data indicated by a GUI element to originate from a data source outside of the graphical program, such as a file, server, or other data source. For example, in the weather application referred to above, the live weather data may be received from the remote computer system and displayed in various GUI elements, e.g., to indicate the temperature, wind speed, humidity, etc. Also, in many cases, it may be desirable for data associated with a GUI element to be provided to a data target outside of the graphical program. For example, a graphical program to control a system located in a remote laboratory may have a graphical user interface panel including various GUI elements such as knobs, buttons, etc. When a user changes the values associated with the GUI elements, it may be desirable for the graphical program to send the values to a program running on a computer system in the remote laboratory which is operable to send control signals to the system, based on the received GUI element values.

Therefore, it would also be desirable to provide a system and method to simplify data exchange for a graphical program, wherein the data is associated with a GUI element. For example, it would be desirable to provide a method for easily enabling a GUI element to subscribe to data from a data source or publish data to a data target.

In the prior art, in configuring a GUI element of a graphical program, a developer typically first includes the GUI element in the graphical program's user interface and then configures the GUI element with the desired behavior, e.g., by programming the GUI element to interface with a data source or data target. According to this methodology, the developer is required to first select an appropriate GUI element for the data source or data target, which, to a certain extent, places the focus of the program development process on the GUI element itself. To enable a more natural development process, it would be desirable to provide a method that allows the developer to specify the data source or data target of interest, and in response, a GUI element appropriate for that data source or target would be automatically included in the program's user interface and automatically configured to subscribe to data from or publish data to the data source or data target, respectively.

As described above, the task of configuring a program to exchange data with a data source or target can be difficult and time-consuming, and some users may not possess the necessary knowledge required, especially those users who are not highly trained in programming techniques. Thus, it would be highly beneficial to enable the user to perform this task without requiring the user to specify or write any source code. For example, it may be desirable to provide one or more user interface dialog boxes or windows with which the user can interact in order to configure the graphical program to exchange data with data sources and/or data targets.

SUMMARY OF THE INVENTION

In various embodiments, the present invention comprises a system and various methods for simplifying or automating the task of configuring a graphical program to exchange data with a data source and/or data target. In response to receiving user input (e.g., input received from a developer of the graphical program) specifying a data source, the graphical program may be automatically, i.e., programmatically, configured to receive data from the data source during program execution. The functionality of receiving the data from the data source is also referred to herein as "subscribing" to data from the data source. Similarly, in response to receiving user input specifying a data target, the graphical program may be automatically, i.e., programmatically, configured to provide or write data to the data target during program execution. The functionality of writing the data to the data target is also referred to herein as "publishing" data to the data target.

The data source or data target may be any of various types. For example, the data source or data target may be a file, a server (or resource associated with a server), etc., and may be located on the host computer system of the graphical program or on a remote computer system. In the preferred embodiment, the data source or data target is specified by a uniform resource locator (URL).

The data source or data target user input information may be received in any of various ways. Typically, this information is received during development or editing of the graphical program. For example, a graphical programming environment may provide an editor or window for including various nodes or block diagram elements in a block diagram and connecting the nodes (block diagram elements) such that they visually indicate functionality of the graphical program. The nodes and other elements (e.g., user interface terminals) displayed on the block diagram are referred to herein as graphical "source code".

In various embodiments, the user input specifying the data source or data target may be received as user input to the block diagram. In one embodiment, the data source or target information may not be initially associated with any particular node or element of the block diagram. For example, the developer may drag and drop an icon representing the data source or target, such as a URL icon or file icon, onto the block diagram window, or the developer may paste data source or target information stored on the clipboard, e.g., a URL, into the block diagram.

In another embodiment, the developer specifying the data source or target information may comprise associating the data source or target information with a particular block diagram element. For example, the developer may drag and drop a URL icon onto a specific node or node terminal. Also, the developer may invoke a configuration command from the context of a particular block diagram element, e.g., by right-clicking on a block diagram node in order to display a user interface dialog for configuring a data connection for the node to a data source or data target.

In response to receiving the URL or other information, the method may operate to present the developer with a user interface, e.g., a user interface dialog, for providing further information. A URL by itself may not designate the referenced resource as either a data source or target. Thus, the dialog may enable the developer to specify whether to treat the referenced resource as a data source or a data target. Also, in one embodiment the resource may be treated as both a data source and a data target, as described below. For example, in one embodiment, the user interface dialog enables the developer to select one of a "Publish", "Subscribe", or "Publish and Subscribe" option.

Once the necessary information regarding the data source or target has been received, the graphical program may be automatically, i.e., programmatically, configured to subscribe to data from the specified data source or publish data to the specified data target. In various embodiments, the automatic configuration of the graphical program may be performed in any of various ways. For example, in one embodiment, the method may automatically, i.e., programmatically, generate a portion of graphical source code and include the source code portion in the block diagram, wherein the source code portion is operable to either receive data from the specified data source or write data to the specified data target.

If the developer associated the data source or data target information with a particular block diagram node or terminal, then the generated source code portion may be automatically connected to that particular node or terminal. For example, as described above, nodes of a block diagram may be connected or wired together in a data flow, control flow and/or execution flow representation. Thus, if a data source was specified, then the generated source code portion may include a node with an output terminal operable to output data received from the data source, and this output terminal may be automatically wired to an input terminal of an existing node, i.e., to an input terminal of the node with which the developer associated the data source information. Similarly, if a data target was specified, then the generated source code portion may include a node with an input terminal operable to receive the data to be written to the data target, and this input terminal may be automatically wired to an output terminal of the existing node.

If the developer did not associate the data source or data target information with a particular block diagram node or terminal, then the generated source code portion may be automatically included in the block diagram, but may not be connected to other elements of the block diagram. The developer may then manually connect the generated source code portion to other elements of the block diagram as desired. Alternatively, the method may prompt the developer to specify a node and/or node terminal to connect the source code portion to. For example, the developer may click on the desired node or node terminal to connect to, or the developer may be presented with a selectable list of the possible connection points from which to choose.

In other embodiments, the graphical program may be configured to interface with the data source or target in ways other than generating and placing source code in the block diagram. For example, the functionality of receiving the data from the data source or writing the data to the data target may not be explicitly displayed on the block diagram. For example, the method may store information regarding the data connection to the data source or data target in a data structure associated with the specific block diagram element which receives data from the data source or provides data to the data target. When the graphical program is compiled, for example, the compiler may use this connection information to enable the graphical program to interface with the data source or target, such that the associated block diagram element receives data from the data source or writes data to the data target during program execution. The developer may view or change the data connection information at edit time, for example, by right-clicking on the block diagram element to display a user interface dialog box.

In many applications, the data received from a data source or provided to a data target may be associated with a graphical user interface (GUI) element in the graphical program. As described above, a graphical program may include a graphical user interface or front panel which displays various GUI elements, such as controls to provide user input to the graphical program and/or indicators to display output from the graphical program. One embodiment of the invention comprises a system and method for enabling a graphical program to receive and display data from a data source in a GUI element or to write data associated with a GUI element to a data target.

When the developer specifies a data source or data target as described above, the developer may associate the data source or target information with a GUI element. For example, many graphical programming environments include a user interface editor or window for designing a graphical user interface. The developer may interact with the user interface editor window to specify the data source or target. For example, the developer may drag and drop an icon representing the data source, such as a URL icon or file icon, onto the window, or the developer may paste in data source information, e.g., a URL, from the clipboard. The developer may also invoke a user interface dialog for specifying the data source or target, similarly as described above. For example, the developer may right-click on a GUI element to display a popup menu for invoking the user interface dialog.

The user input specifying the data source or target to associate with a GUI element may also be received from the context of the graphical program's block diagram. In various embodiments, a graphical program's block diagram may include block diagram elements, e.g., nodes or terminals, representing or corresponding to GUI elements. Thus, the developer may specify one of these block diagram elements, similarly as described above.

If the developer associates a GUI element with a data source, then the method may automatically configure the graphical program to receive data from the data source and display the data in the GUI element during program execution. Similarly, if the developer associates a GUI element with a data target, then the method may automatically configure the graphical program to provide or write data associated with the GUI element, such as user input data or data programmatically associated with the GUI element, to the data target during program execution.

In the above description, the developer associates a data source or target with an existing GUI element. In another embodiment, the method may be operable to automatically create an appropriate GUI element and include the GUI element in the graphical program's GUI. For example, when the developer specifies the data source or target information, he may also specify that the data source or target should be associated with a new GUI element. As described below, the method may automatically determine an appropriate GUI element to include in the GUI. Alternatively, the method may prompt for user input specifying a desired GUI element to include in the GUI.

If a data source is specified, the method may operate to automatically determine a GUI element operable to display (or otherwise indicate) data received from the data source and may automatically include the GUI element in the program's graphical user interface (GUI) and automatically configure the graphical program to receive data from the specified data source during execution of the program and display the data in the GUI element. If a data target is specified, the method may operate to automatically determine a GUI element for inclusion in the graphical program's GUI and automatically configure the graphical program to write data associated with the GUI element to the specified data target during execution of the program.

Automatically including the GUI element in the GUI of the graphical program may comprise including a block diagram element corresponding to the GUI, e.g., a node, in the block diagram of the graphical program. Similarly as described above, a graphical source code portion that implements receiving data from the data source or writing data to the data target may be programmatically generated, and this source code portion may be connected to the GUI block diagram element. Also, as described above, the GUI block diagram element may be configured to interface with the data source or target without explicitly showing source code for this functionality on the block diagram, e.g., such that the developer can invoke a configuration dialog to view or edit the configuration information for the GUI block diagram element.

A GUI element automatically included in the GUI in response to the data source/target information may be an element of any of various types, e.g., depending on which GUI elements are supported by a particular graphical programming environment. For example, various graphical programming environments may support GUI elements such as graphs, text boxes, check boxes, knobs, etc., among various other types of GUI elements.

Any of various techniques may be used in determining an appropriate GUI element for subscribing to data received from a data source. If the data source is a server (or is located on a server), the method may automatically connect to the server and receive data from the server. The appropriate GUI element to include in the program's GUI may then be determined based on the data received. Any of various types of data may be associated with a data source, such as strings, scalars, Booleans, waveforms, etc.

As well known in the art, the beginning portion of a URL specifies an access protocol. For example, the URL "http://www.ni.com/map.htm" specifies the hypertext transfer protocol (HTTP) as an access protocol. In one embodiment, a data source/target may be accessed using a protocol that supports self-describing data. One example of such a protocol, the DataSocket Transport Protocol (DSTP) is discussed below. The DSTP protocol is used when interfacing with a type of server described herein, referred to as a DataSocket server. As an example, the data source URL may be a URL such as "dstp://dsserver.ni.com/wave", and data received from this data source (i.e., received from the DataSocket server when accessing this data source) may be two-dimensional waveform data. For example, the data may comprise live waveform data that is generated in real time. Since the data is received in a self-describing format, the method may determine that an appropriate GUI element for displaying the data would be a chart GUI element.

In some cases, more than one GUI element may be operable to display the data received from a data source. Thus, in one embodiment, the method may present the developer with a list of items or icons corresponding to the possible GUI elements, and the developer may select which one to use. Alternatively, the method may select one of the GUI elements to use, without receiving user input. For example, the selection of default GUI elements to use for various types of data may be user-configurable.

In some cases it may not be possible to determine an appropriate GUI element by examining data received from the data source. For example, the access protocol used may not support self-describing data. In this case, it may be possible to determine an appropriate GUI element based on other information. For example, if the URL specifies a file name, the GUI element may be determined based on the file extension. For example, if the URL specifies a file such as "ftp://ftp.ni.com/wavel.wav" then the method may determine that the data is waveform data, based on the ".wav" file extension. Thus, a chart GUI element may be used to display this waveform data.

If it is not possible to automatically determine an appropriate GUI element, then the method may prompt for user input. For example, the method may display a user interface dialog or window enabling the developer to easily select which GUI element to associate with the specified data source.

In one embodiment, once a GUI element has been determined and included in the program's graphical user interface, the developer may be allowed to easily change the GUI element to a new type of GUI element. For example, if a first GUI element was automatically determined and included in the GUI, the developer may override this choice by changing the first GUI element to a new type of GUI element, e.g., by right-clicking on the first GUI element or on a block diagram node corresponding to the first GUI element and selecting a popup menu item to change the type.

In one embodiment, the decision of which GUI element to include in the program's GUI may be deferred until the program is executed, or the GUI element may be changed to a new type during program execution. For example, it may not be possible to connect to a data source during program development. Also, the type of data associated with the data source could change from development time to runtime. Thus, in these cases it may be desirable to examine the data at runtime and select an appropriate GUI element dynamically.

As described above, in addition to displaying data from a data source in a GUI element, the developer may also want to publish data from a GUI element to a data target. If a data target is specified, the method may prompt for user input in order to determine an appropriate GUI element to include in the graphical user interface. Also, it may be possible to automatically select a GUI element, e.g., based on a file extension of the data target, if applicable, or based on information in a URL referencing the data target. For example, the method may be operable to maintain or access data on which types of GUI elements were used in the past in connection with which types of data targets.

Once the graphical program has been automatically configured to interface with a data source or target as described above, the graphical program may be executed. During program execution, the graphical program is operable to automatically, i.e., programmatically, determine and use an appropriate protocol for interfacing with the data source/target, such as HTTP, FTP, DSTP, SNMP, etc.

If the developer configured the graphical program to subscribe to data from a data source, then the program may connect to or open the data source, using an appropriate protocol or access method, and receive data from the data source. This data may then be provided to the block diagram element with which the developer associated the data source. The data may then be processed according to the functionality of this block diagram element. If the developer associated the data source with a GUI element then the data may be provided to the GUI element for display. The GUI element may display or indicate the data in various ways, e.g., depending on the type of data and/or the GUI element type. As an example, live data generated in real time may be received and displayed.

If the developer configured the graphical program to publish data to a data target, then the program may connect to or open the data target, using an appropriate protocol or access method, and send or write data from the block diagram element with which the developer associated the data target. If the developer associated a GUI element with the data target then data associated with the GUI element may be written to the data target. For example, data may be associated with the GUI element programmatically. In other words, the program may operate to generate data during program execution and provide the data to the GUI element, such as for display. In the prior art GUI of FIG. 1, for example, the program includes source code to programmatically specify power spectrum data for the Power Spectrum chart to display. Thus, the developer could easily configure the Power Spectrum chart to publish the power spectrum data to a data target, e.g., to provide the data to a remote application or write the data to a file.

In other cases, GUI element data to be published to a data target may be received as user input. In the prior art GUI of FIG. 1, for example, a data value for the Frequency knob GUI element is received as user input. Thus, the developer could easily configure the knob to publish the input frequency value received from the user to a data target, e.g., to control a remote system operable to receive the frequency value from this data target or to allow a remote user to view the input data being provided to the program.

In one embodiment, the developer may configure a GUI element to both publish and subscribe to data. For example, the developer could configure a knob GUI control, such as the Frequency knob shown in the GUI of FIG. 1, to publish and subscribe to data. For example, consider a situation in which two control programs execute at different locations, wherein both control programs monitor a remote system and control the opening and closing of a valve in the remote system. A knob GUI control for each program may display a value indicating a setting for the remote system valve. If a user of one of the control programs, i.e., the "first" control program, turns the knob, then the first control program may send a control message to the remote system, causing the remote system to adjust the valve setting accordingly. The first control program may also publish the new knob setting value to a data target/source, such as a server, to which the knob GUI control of the first control program is configured to publish and subscribe. The other control program, i.e., the "second" control program, may also subscribe and publish to this data source/target, so that the change in the knob setting is automatically reflected on the GUI of the second control program. Since both control programs publish and subscribe to the data source/target, a change in the GUI knob control setting that originates from the second control program will similarly be automatically reflected on the GUI of the first control program.

The scenario described above is one example of exchanging "live" data between different applications. In this case, data may be exchanged only periodically, e.g., when a user turns a knob GUI control on one of the control programs. In other cases, live data may be exchanged continuously. Other examples of live data exchange include: a reader application that subscribes to live multimedia data, e.g., audio data, generated by a writer application; two chat programs that exchange live text data with one another; etc. Also, as measurement and automation applications have become increasingly distributed and software-oriented, live data exchange has become especially important in these applications, e.g., in order to send acquired or generated signals across a network.

In various embodiments, the live data exchange may be implemented in any of various ways. In one embodiment, a server program or process may act as an intermediate between a writer program that writes live data and a reader program that subscribes to the live data. In one embodiment, multiple reader programs may receive and display data generated by a writer program, by interfacing with the server. For example, multiple users may execute a reader program to view live weather data. In the prior art, creating these types of applications is typically a complicated task, but one embodiment of the present invention enables data exchange between a writer program and multiple reader programs executing in different locations to occur without the developer having to specify or write any source code to accomplish the data exchange.

In one embodiment, a graphical program configured as described above with a data connection to a data source or target may utilize a separate layer or component for interfacing with the data source or target. One embodiment of such a layer, referred to as "DataSocket", is described. DataSocket provides a single, unified, end-user application programming interface (API) for connecting to data from a number of sources, such as local files, files on FTP or Web servers, and data items on OPC Servers. A DataSocket application specifies the data location by using a familiar networking standard, the URL. Just as a Web browser uses a URL to connect to a Web page, a DataSocket application uses a URL to connect to data. In addition, the DataSocket Transfer Protocol connects a DataSocket application to live data by specifying a connection to a DataSocket Server. The DataSocket Server manages most of the networking tasks for the developer.

With conventional technologies such as TCP/IP, the developer would have to write code to convert data to an unstructured stream of bytes in the broadcasting application, as well as code to parse the stream of bytes back into its original form in subscribing applications. DataSocket, however, transfers data in a self-describing format that can represent data in an unlimited number of formats, including strings, scalars, Booleans, and waveforms. The DataSocket read and write operations transparently convert data to and from the underlying byte streams, eliminating the need to write complicated parsing code. DataSocket uses the DataSocket Transport Protocol (DSTP), referred to above, to send data to and receive data from a DataSocket server.

BRIEF DESCRIPTION OF THE DRAWINGS

A better understanding of the present invention can be obtained when the following detailed description of the preferred embodiment is considered in conjunction with the following drawings, in which.

Figure 1:
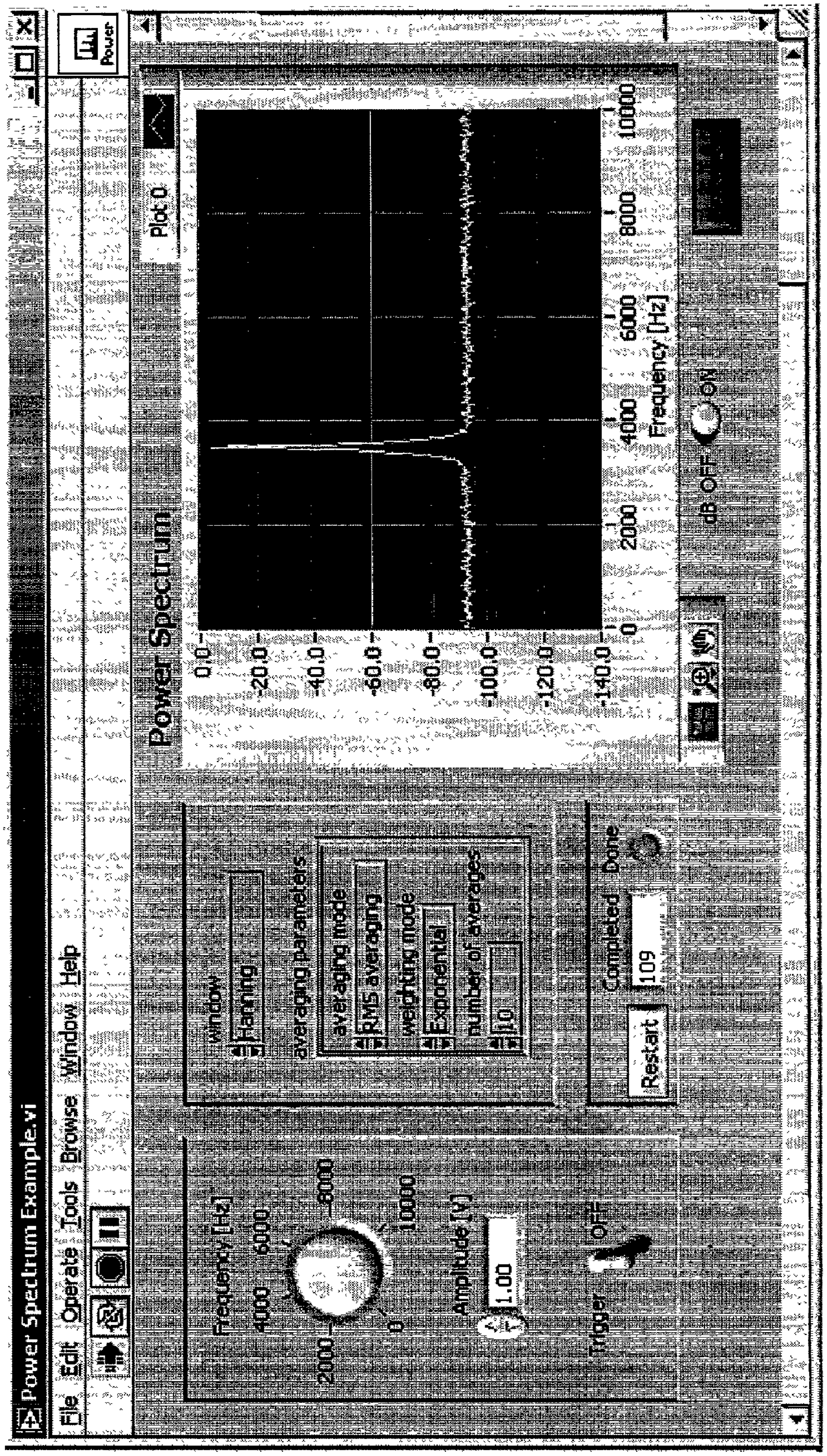
FIGS. 1 and 2 (prior art) illustrate several GUI elements, including GUI elements that may be used in instrumentation or measurement applications.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent application Ser. No. 09/185,161 titled, "DataSocket System and Method for Accessing Data Sources Using URLs" filed on Nov. 3, 1998, whose inventor was Paul Austin;

U.S. patent application Ser. No. 09/374,740 titled, "System and Method for Automatically Creating URLs for Accessing Data Sources and Data Targets" filed on Aug. 13, 1999, whose inventors were Paul F. Austin, David W Fuller, Brian H. Sierer, Kurt Carlson, Stephen Rogers and Chris Mayer; and U.S. patent application Ser. No. 09/518,492 titled, "System and Method for Programmatically Creating a Graphical Program," filed on Mar. 3, 2000, whose inventors were Ram Kudukoli, Robert Dye, Melanie Jensen, and Yumiko Kawachi.

U.S. patent application Ser. No. 09/546,047 titled, "System and Method for Connecting to and Viewing Live Data using a Standard User Agent," filed on Apr. 10, 2000, whose inventor was Paul F. Austin.

U.S. patent application Ser. No. 09/737,527 titled, "System and Method for Configuring a GUI Element to Publish or Subscribe to Data," filed on Dec. 13, 2000, whose inventor was Paul Astin.

U.S. patent application Ser. No. 09/737,639 titled, "System and Method for Automatically Configuring Program Data Exchange," filed on Dec. 13, 2000, whose inventor was Paul Astin.

Figure 3A:
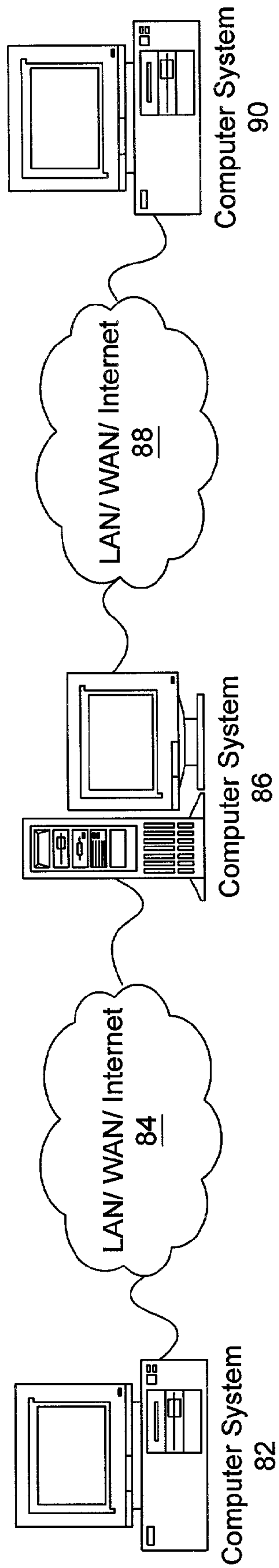
FIGS. 3A and 3B illustrate exemplary networked computer systems.
Figure 3B:
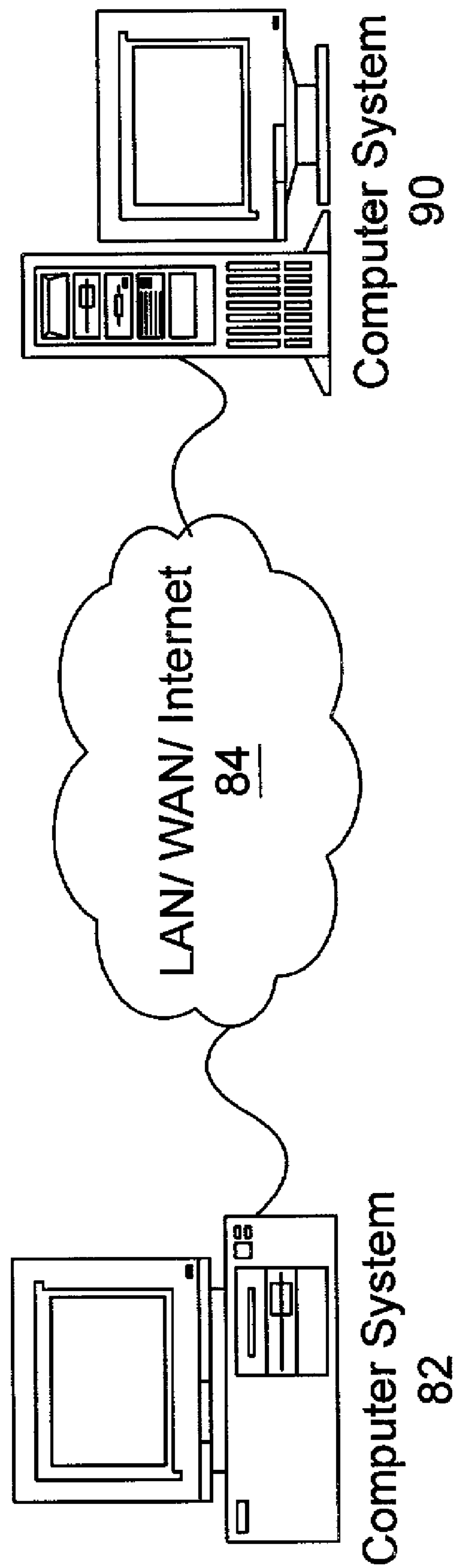

FIGS. 3A and 3B—Computer Systems Connected Via a Network

One embodiment of the present invention enables program developers to easily create a graphical program that exchanges data with another program, including cases where the programs execute on separate computer systems. FIGS. 3A and 3B illustrate exemplary networked computer systems. It is noted that FIGS. 3A and 3B are exemplary only and that, in various embodiments, the present invention may be used in any type of system, including a system with only one computer.

FIG. 3A illustrates an exemplary system in which a first computer system 82 is connected through a network 84 to a second computer system 86, and the second computer system 86 is connected through a network 88 to a third computer system 90. The computer systems 82, 86, and 90 can be any of various types, as desired. The networks 84 and 88 can also be any of various types, including the Internet, a LAN (local area network), or a WAN (wide area network), among others. The networks 84 and 88 may also be the same network.

In one embodiment, the first computer system 82 may execute a writer program that generates data, and the third computer system 90 may execute a reader program that uses the data generated by the first computer system 82. Either or both of the writer or reader programs may be graphical programs developed according to various embodiments of the methods described below. The computer system 86 may act as an intermediate server between the writer program and the reader program. For example, the intermediate server 86 may execute a server program (or process) with which the writer program and the reader program interface in order to exchange data. One embodiment of such a server program, referred to herein as a "DataSocket server," is described below.

Such an intermediate server program may not necessarily execute on a separate computer system from the writer and reader programs. For example, the computer system 82 may execute the writer program which may interface with a server program also executing on the computer system 82. In this case, a reader program may interface with the server program executing on the computer system 82 in order to receive the data generated by the writer program. For example, the reader program may execute on the computer system 90, e.g., as shown in FIG. 3B, or may execute on the same computer system 82. Alternatively, the writer program may execute on the computer system 82, and the server and reader programs may execute on the computer system 90.

The reader program may be a graphical program configured to subscribe to a data target to which the writer program writes data. In other words, the data target for the writer program may be a data source for the reader program. As described below, one embodiment of the present invention enables the program developer to easily associate a data source with a graphical program, by automatically configuring the graphical program to interface with the data source, without the developer having to specify or write any source code. In one embodiment, the data source may be associated with a graphical user interface (GUI) element of the reader program, such that the GUI element indicates data received from the data source, e.g., by displaying the data in various ways.

The writer program may be a graphical program configured to publish data to a data source from which the reader program receives data. In other words, the data source for the reader program may be a data target for the writer program. As described below, one embodiment of the present invention enables the developer to easily associate a data target with a graphical program, by automatically configuring the graphical program to interface with the data target, without the developer having to specify or write any source code. In one embodiment, the data target may be associated with a GUI element of the writer program, such that the graphical program is operable to publish data associated with the GUI element to the data target.

It is noted that either of the writer or reader programs may not be graphical programs, or may not be graphical programs developed or configured according to the methods described herein. Thus, one or both of a writer program and reader program may implement one embodiment of the present invention, and each of the writer program and reader program may interface with various applications or programs which can publish or subscribe to data over a network but which do not utilize the present invention.

For example, the writer program may be a text-based program, such as a program developed using a text-based language such as Java, C, Basic, etc. Also, the writer program may be a graphical program, but may include user-specified graphical source code to implement writing the data to the data target, rather than having been automatically configured to write the data to the data target with no user-created source code required.

In a case where the writer program is a graphical program that has a graphical user interface with a GUI element that displays the data that needs to be written to the data target, it may be beneficial to enable the developer to easily configure the GUI element to publish the data to the data target, e.g., as a very easy way to write the data to the data target. However, the writer program may not have a graphical user interface or may not display the data in a GUI element. For example, the reader program may receive data from a writer program executing on an embedded device that acquires real-time data from a physical system. Thus, the developer may also configure the data to be written to the data target from various function nodes or other elements of the graphical program's block diagram.

Similarly, the reader program may not be a graphical program and/or may include user-specified source code to implement receiving the data from the data source, rather than having been automatically configured to subscribe to the data source with no user-created source code required.

In a case where the reader program is a graphical program that has a graphical user interface with a GUI element that needs to display the data from the data source, it may be beneficial to enable the developer to easily configure the GUI element to subscribe to the data from the data source, e.g., as a very easy way to obtain and display the data. However, the reader program may not include a graphical user interface or may not display the data received from the data source to the user. Thus, the developer may also configure various function nodes or other elements of the graphical program's block diagram to subscribe to the data source.

To illustrate one example of a writer and reader program, consider a writer program executing on a computer system in a laboratory, wherein the writer program is operable to continuously acquire signal data from a hardware unit under test. The writer program may publish the acquired signal data to a data target, such as a server.

In one case, the writer program may be a graphical program having a graphical user interface panel that includes a GUI element for displaying the signal data, such as a chart GUI element operable to display the signal data as a two-dimensional waveform. In this case, the developer of the writer program may easily configure the writer program to publish the signal data to the data target by simply associating the data target with the chart GUI element, according to one embodiment of the present invention. For example, as described below, the developer may simply invoke a user interface dialog box and specify a URL referencing the desired data target for the chart GUI element. In response, the writer program may be automatically, i.e., programmatically, configured to provide the signal data from the chart GUI element to the data target during execution of the writer program. Thus, the developer of the writer program may not need to specify or write any source code to accomplish the publication of the signal data to the data target.

In other cases, the writer program may publish the signal data to the data target in other ways. For example, the developer of the writer program may manually create source code to accomplish the publication of the signal data. Also, in other cases, the writer program may not have a GUI element that displays the signal data or may not even have a graphical user interface.

In this example, a reader program may be operable to subscribe to the data target, e.g., the server, to which the writer program publishes the signal data. In other words, the data target for the writer program is a data source for the reader program.

In one case, the reader program may be a graphical program having a graphical user interface panel that includes a GUI element for displaying the signal data acquired from the data source/target, such as a chart GUI element operable to display the signal data as a two-dimensional waveform. For example, a user may execute the reader program in a remote computer system outside of the laboratory, in order to remotely monitor the hardware unit under test.

The developer of the reader program may easily configure the reader program to subscribe to and display the signal data by simply specifying the desired data source, according to one embodiment of the present invention. For example, the developer may provide a URL referencing the data source, e.g., by typing the URL or pasting the URL into a user interface editor window or block diagram editor window. In response, the development environment may be operable to determine that a chart GUI element is an appropriate GUI element to display data received from the specified data source, as described below. The development environment may then automatically include the chart GUI element in the program's graphical user interface. In another embodiment, the developer may first include the chart GUI element in the program's GUI manually and may then specify a data source for the GUI element.

The GUI element which is included (either automatically or manually) in the program's GUI may then be automatically, i.e., programmatically, configured to receive the signal data from the data source during execution of the reader program and display the signal data. Thus, the developer of the reader program may not need to specify or write any source code to accomplish the acquisition and display of the signal data.

In other cases, the reader program may acquire the signal data from the data source in other ways. For example, the developer of the reader program may manually create source code to acquire the signal data. Also, in other cases, the reader program may not have a GUI element that displays the signal data or may not even have a graphical user interface. For example, the reader program may acquire the signal data and log the data to a file, without displaying it.

It is noted that various embodiments of the present invention do not use a writer and reader program together such as described above. A writer and reader program may be used together, for example, when "live" data needs to be exchanged between two applications. However, some programs may need to receive data from or write data to a data source/target not associated with another program, such as a file, or other type of data source/target, such as a hardware device. For example, in one embodiment, a graphical program may be automatically configured (i.e., with no explicit source code required) to receive data from a file and display the data. Another program may include a GUI element to automatically (i.e., with no explicit source code required) write data associated with the GUI element to a file. In these types of cases a writer or reader program executing on the host computer system 82 may be configured to write data to or read data from a data target or source located either on the host computer system 82 or on another computer system connected via a network, such as computer system 90. Thus, embodiments of the invention may be used with "live" and/or "non-live" data.

Figure 4A:
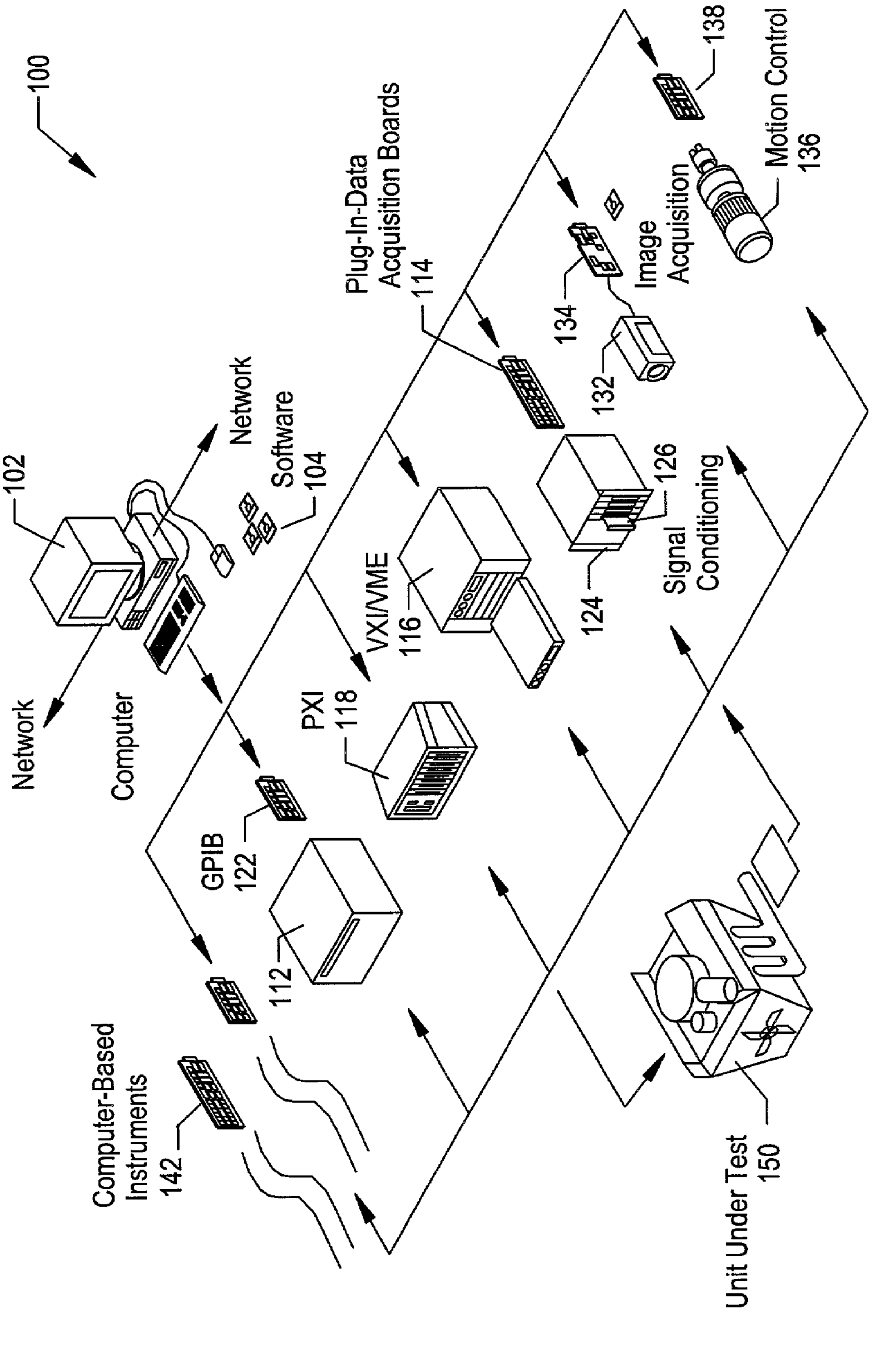
FIGS. 4A and 4B illustrate representative instrumentation and process control systems including various I/O interface options.
Figure 4B:
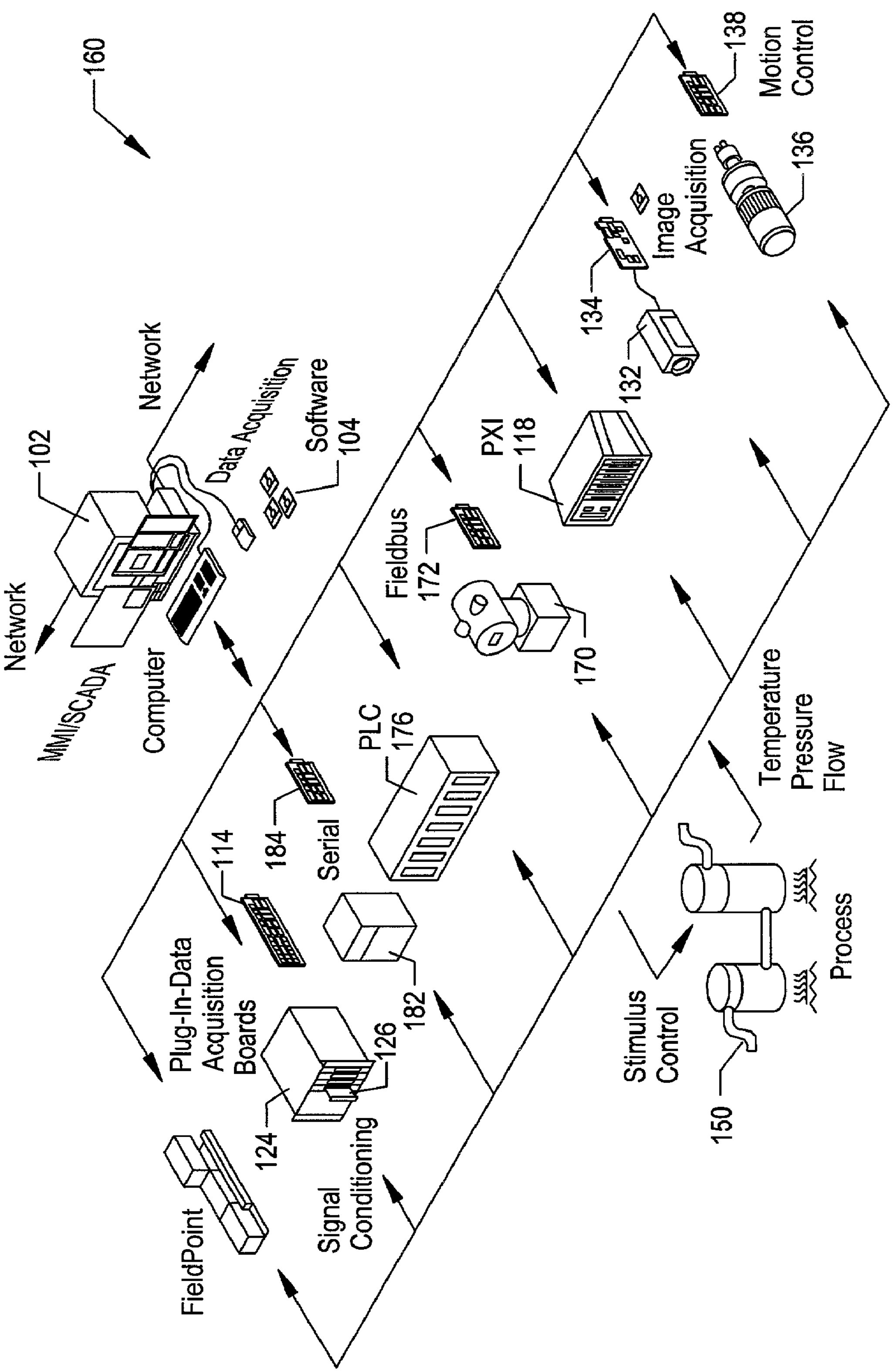

FIGS. 4A and 4B—Instrumentation and Industrial Automation Systems

FIGS. 4A and 4B illustrate an exemplary computer 102 having various types of instruments or hardware devices connected. In various embodiments, the computer 102 may be any of the computers 82, 86, or 90 discussed above. For example, a writer program may execute on the computer 102 and may write data acquired from a connected hardware device to a data target. It is noted that FIGS. 4A and 4B are exemplary only, and in alternative embodiments, writer and/or reader programs such as described herein may execute on any of various types of systems and may be used in any of various applications.

FIG. 4A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 4B illustrates an exemplary industrial automation system 160. The industrial automation system 160 is similar to the instrumentation or test and measurement system 100 shown in FIG. 4A. Elements which are similar or identical to elements in FIG. 4A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 4A and 4B, the computer system 102 preferably includes a memory medium on which software according to one embodiment of the present invention is stored. For example, the memory medium may store a reader graphical program and/or a writer graphical program which are configured to subscribe to data from a data source and/or publish data to a data target, as described herein. Also, the memory medium may store an application development environment which utilizes the methods described herein to support the creation and/or execution of such reader/writer programs, and/or may store "DataSocket" software as well as other software that enables a graphical program to subscribe to data from various types of data sources and/or publish data to various types of data targets.

The term "memory medium" is intended to include an installation medium, e.g., a CD-ROM, floppy disks 104, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, embedded computer, or other device. In general, the term "computer system" can be broadly defined to encompass any device having at least one processor which executes instructions from a memory medium.

Figure 5:
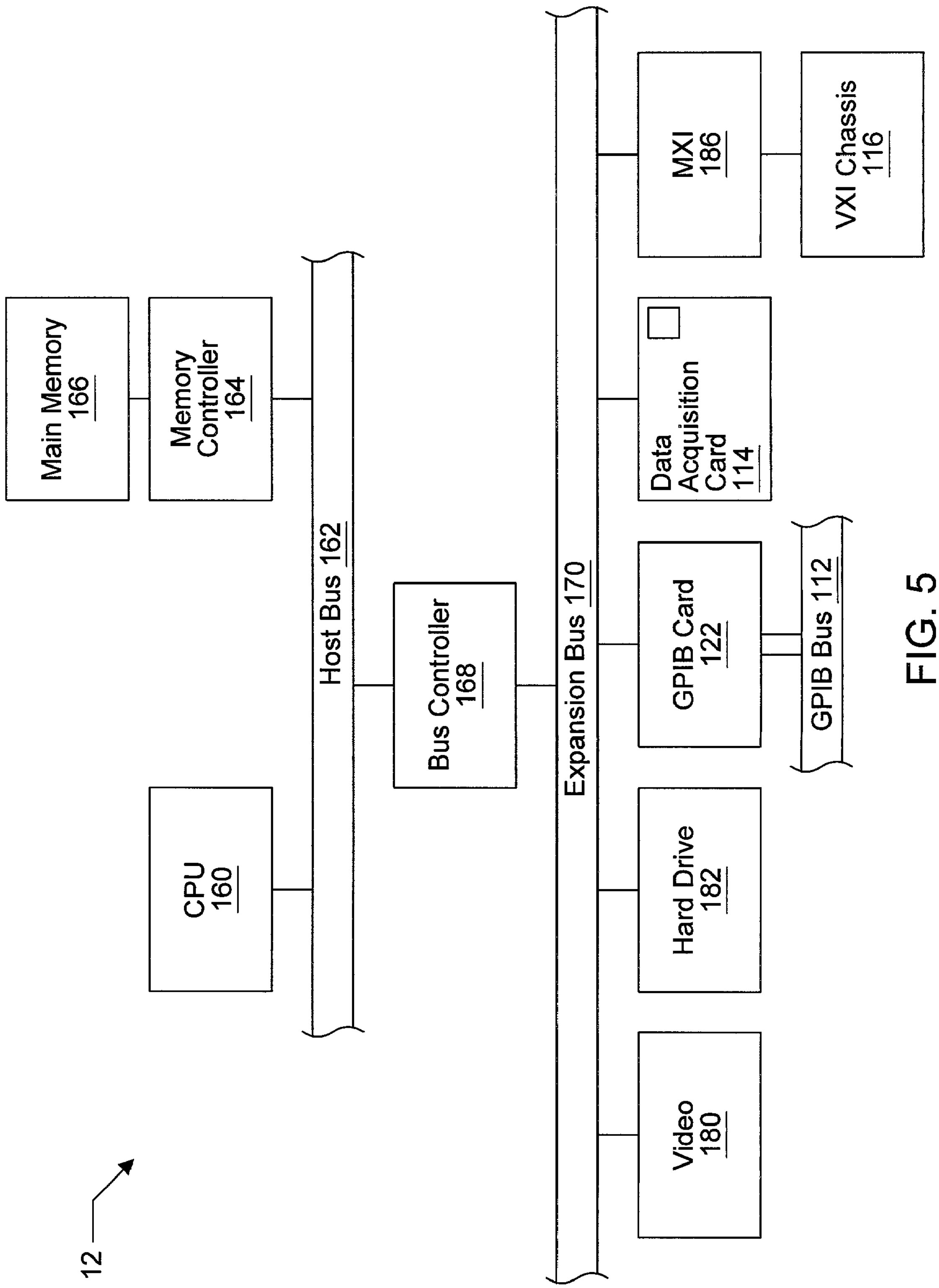
FIG. 5 is an exemplary block diagram of the computer systems illustrated in FIGS. 4A and 4B.

FIG. 5—Computer System Block Diagram

FIG. 5 is an exemplary block diagram of the computer systems illustrated in FIGS. 4A and 4B. It is noted that any type of computer system configuration or architecture can be used as desired, and FIG. 5 illustrates a representative PC embodiment. It is also noted that the computer system may be a general purpose computer system as shown in FIGS. 4A and 4B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one processor or central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as a reader graphical program and/or a writer graphical program, and/or an application development environment operable to create the reader/writer programs. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 4A), a GPIB interface card 122 which provides a GPIB bus interface to the GPIB instrument 112 (of FIG. 4A), and a VXI or MXI bus card 186 coupled to the VXI chassis 116 for receiving VXI instruments. The computer 102 further comprises a video display subsystem 180 and hard drive 182 coupled to the expansion bus 170.

Figure 6:
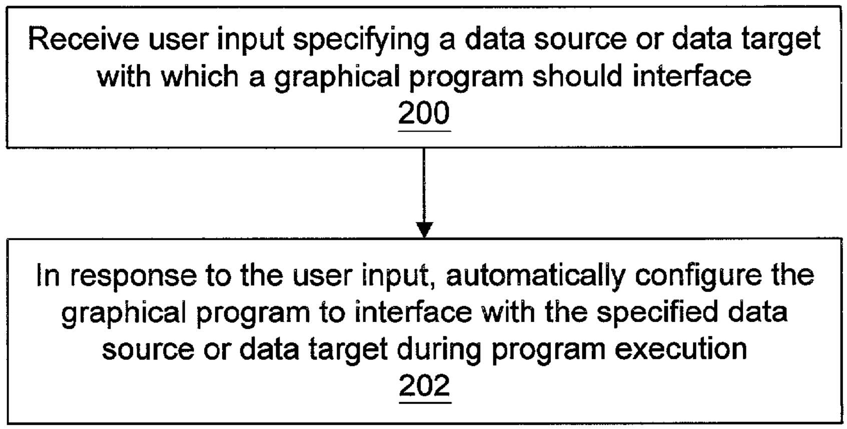
FIG. 6 is a flowchart diagram illustrating one embodiment of a method for automatically configuring a graphical program to interface with a data source or data target, e.g., to receive data from the data source or provide data to the data target.

FIG. 6—Automatic Configuration of a Graphical Program

FIG. 6 is a flowchart diagram illustrating one embodiment of a method for automatically configuring a graphical program to interface with a data source or data target, e.g., to receive data from the data source or provide data to the data target.

In step 200, user input (e.g., input received from a developer of the graphical program) specifying a data source or data target may be received. For example, this information may be received by a graphical programming environment application during the editing of a graphical program.

In step 202, in response to the user input, the graphical program may be automatically, i.e., programmatically, configured to interface with the specified data source or data target. If a data source was specified, then the graphical program may be configured to receive data from the data source during program execution. The functionality of receiving the data from the data source is also referred to herein as "subscribing" to data from the data source. Similarly, if a data target was specified, then the graphical program may be configured to provide or write data to the data target. The functionality of writing the data to the data target is also referred to herein as "publishing" data to the data target.

The data source or data target may be any of various types. For example, the data source or data target may be a file, a server (or resource associated with a server), etc., and may be located on the host computer system of the graphical program or on a remote computer system. In the preferred embodiment, the data source or data target is specified by a uniform resource locator (URL).

The data source or data target user input information may be received in any of various ways. For example, a graphical programming environment may provide an editor or window for including various nodes or other elements in a block diagram and connecting the nodes and other block diagram elements such that they visually indicate functionality of the graphical program. The interconnected nodes and other elements displayed on the block diagram are referred to herein as graphical "source code".

In various embodiments, the user input specifying the data source or data target may be received as user input to the block diagram. In one embodiment, the data source or target information may not be initially associated with any particular element of the block diagram. For example, the graphical program developer may drag and drop an icon representing the data source or target, such as a URL icon or file icon, onto the block diagram window, or the developer may paste data source or target information stored on the clipboard, e.g., a URL, into the block diagram. Alternatively, the developer may type in the URL into a text box on a block diagram window or user interface editor window. Also, the developer may select a URL or a named data source or target using a "browse" method that enables selection from various known data sources or targets.

In another embodiment, the developer specifying the data source or target information may comprise associating the data source or target information with a particular block diagram element. For example, the developer may drag and drop a URL icon onto a specific node or node terminal. Also, the developer may invoke a configuration command from the context of a particular block diagram element, e.g., by right-clicking on a block diagram node or node terminal in order to display a user interface dialog for configuring a data connection for the node to a data source or data target.

Figure 7:
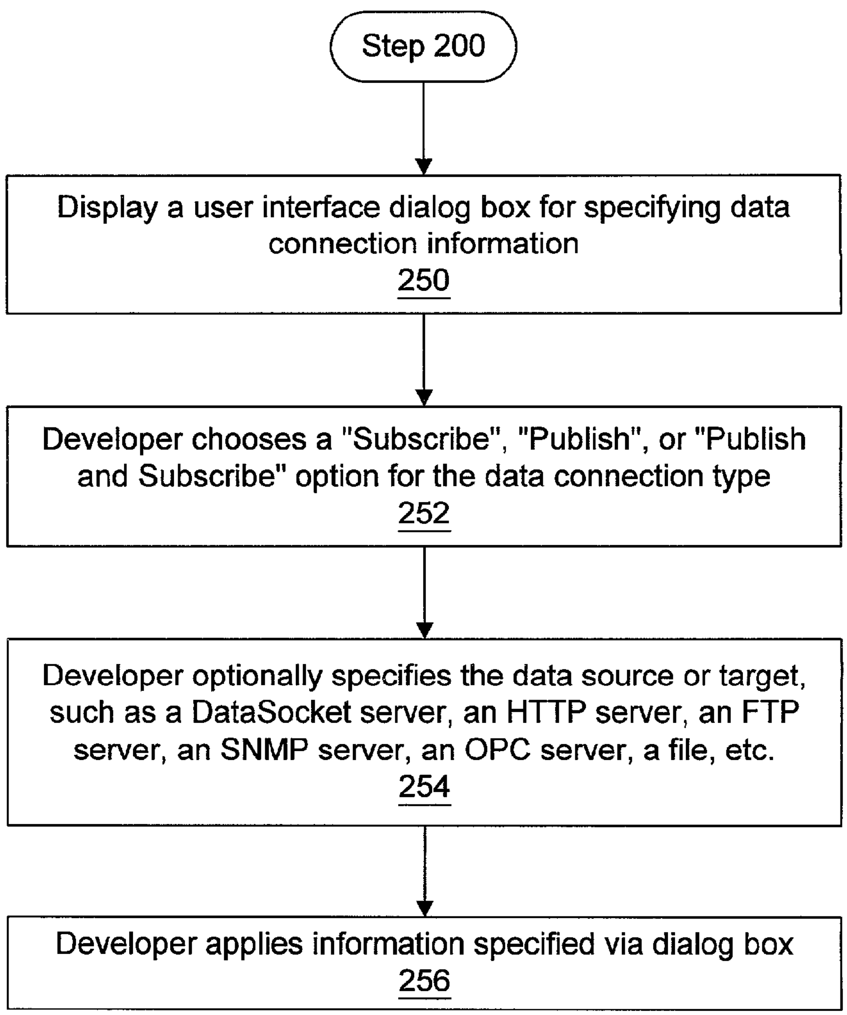
FIG. 7 is a flowchart diagram illustrating one embodiment of a method for receiving user input specifying a data source or data target, wherein the developer invokes a user interface dialog box for specifying the information.
Figure 8:
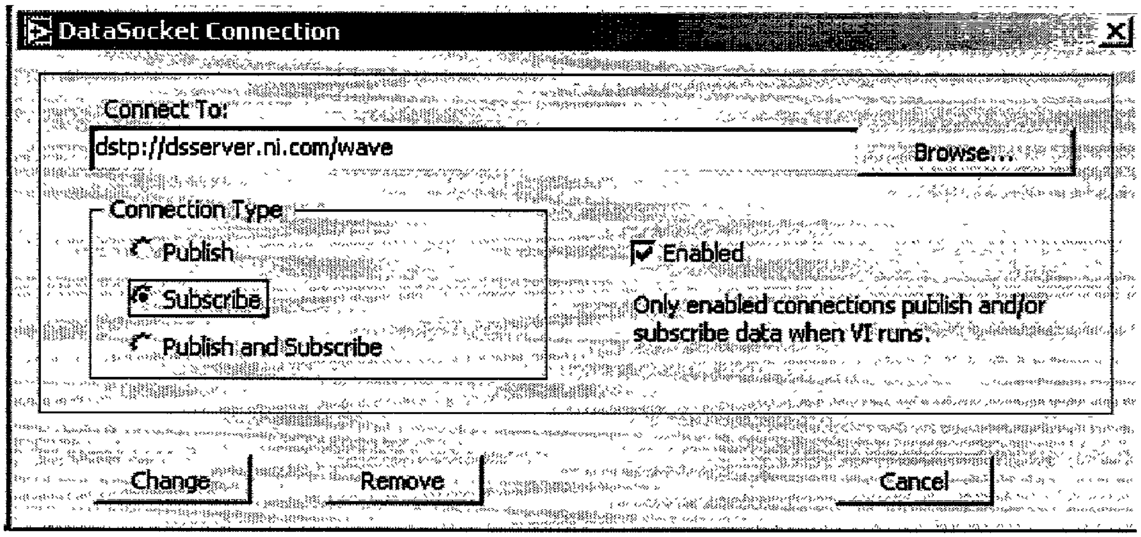
FIG. 8 illustrates an exemplary dialog box for specifying data connection information, wherein the user has chosen a "Subscribe" option specifying that the graphical program should subscribe to data from a data source.

FIG. 7 is a flowchart diagram illustrating one embodiment of a method for receiving the user input specifying the data source or data target, wherein the developer invokes a user interface dialog box for specifying the information. In step 250, the developer displays the user interface dialog box for specifying the data connection information, e.g., by right-clicking on a block diagram element to execute a menu option to display the dialog box. FIG. 8 illustrates an exemplary user interface dialog box for specifying data connection information.

Figure 9:
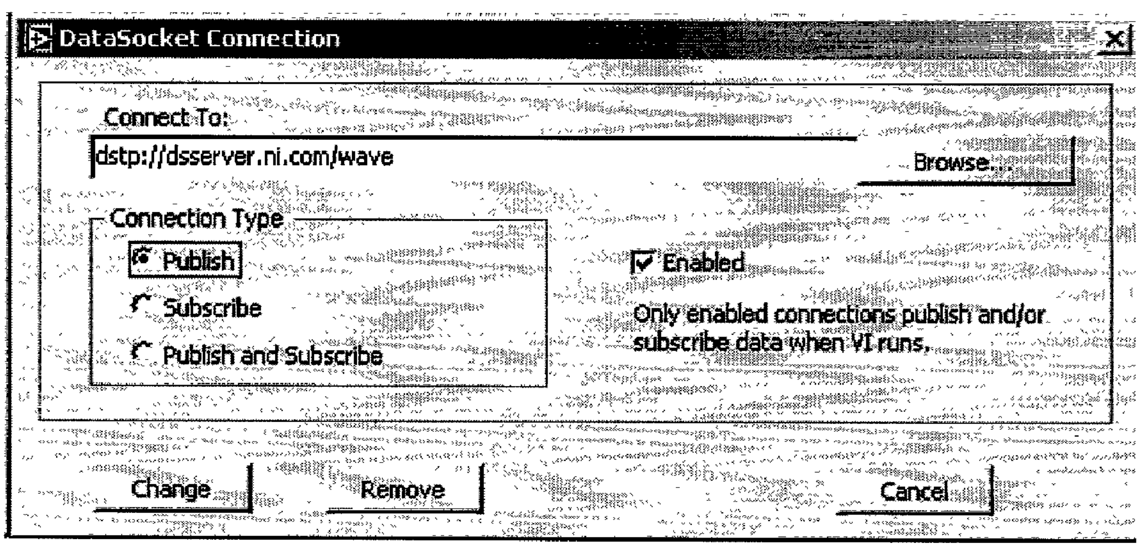
FIG. 9 illustrates an exemplary dialog box for specifying data connection information, wherein the user has chosen a "Publish" option specifying that the graphical program should publish data to the data source.

As described above, the data source or data target input may comprise a URL. A URL by itself may not designate the referenced resource as either a data source or target. Thus, the user interface dialog may enable the developer to specify whether to treat the referenced resource as a data source or data target, as shown in step 252. For example, the dialog box of FIG. 8 enables the developer to choose from "Publish", "Subscribe" or "Publish and Subscribe" options. For example, to specify a data source, the developer would choose the "Subscribe" option for the data connection type, as shown in FIG. 8. To specify a data target, the developer would choose the "Publish" option for the data connection type, as shown in FIG. 9.

In some cases, it may be possible to automatically determine whether the developer wants to interface with a data source or target. For example, the developer may right-click on an input terminal of a block diagram node and invoke the dialog box from that context, in order to configure the terminal with input data. In this case, the graphical program would interface with a data source in order to obtain the input data. If, on the other hand, the developer right-clicked on an output terminal of a block diagram node, then the graphical program would interface with a data target in order to provide output data from the node to the data target.

As shown in step 254, the dialog box may enable the developer to specify a reference to the data source or target. For example, the dialog box of FIG. 8 also illustrates a text field labeled "Connect To", in which the developer may type or paste a URL. In another embodiment, the dialog box may have been invoked in response to receiving a URL. For example, as noted above the developer may have drag-and-dropped or pasted URL information into the block diagram window. In this case, the "Connect To" field may be prepopulated with the specified URL.

In the preferred embodiment, various types of data sources or data targets may be specified. For example, the developer may specify a server, such as a HyperText Transfer Protocol (HTTP) server, a File Transfer Protocol (FTP) server, an OLE for Process Control (OPC) server, a Simple Network Management Protocol (SNMP) server, or a type of server referred to herein as a DataSocket server (discussed below). The developer may also specify a file as the data source or data target.

In step 256, the developer may apply the information specified in the dialog box, e.g., by clicking on the "Change" button shown in FIG. 8.

Once the necessary information regarding the data source or target has been received, the graphical program may be automatically, i.e., programmatically, configured to subscribe to data from the specified data source or publish data to the specified data target. In various embodiments, the configuration of the graphical program may be performed in any of various ways. For example, in one embodiment, the method may automatically, i.e., programmatically, generate a portion of graphical source code and include the source code portion in the block diagram, wherein the source code portion is operable to either receive data from the specified data source or write data to the specified data target.

In one embodiment, the method may programmatically generate a single node that is operable to connect to the data source or target. One example of such a node is referred to as a DataSocket primitive node. The method may also generate and display a URL item, e.g., a text constant, that is connected to an input of the DataSocket node. This visually indicates to the developer the URL of the data source or data target being accessed. In this embodiment, the single DataSocket primitive node is the only graphical source code required to connect to a data source or data target. In another embodiment, the method may programmatically generate a plurality of nodes that are interconnected to comprise the source code portion.

If the developer associated the data source or data target information with a particular block diagram node or terminal, then the generated source code portion (e.g., one or more nodes) may be automatically connected to that particular node or terminal. For example, as described above, nodes of a block diagram may be connected or wired together in one or more of a data flow, control flow and/or execution flow representation. Thus, if a data source was specified, then the generated source code portion may include a node with an output terminal operable to output data received from the data source, and this output terminal may be automatically wired to an input terminal of an existing node, i.e., to an input terminal of the node with which the developer associated the data source information. Similarly, if a data target was specified, then the generated source code portion may include a node with an input terminal operable to receive the data to be written to the data target, and this input terminal may be automatically wired to an output terminal of the existing node. If the developer associated the data source or target information with a graphical user interface element in the graphical program's user interface, then the source code portion may be automatically connected to a node or terminal in the block diagram that corresponds to the selected graphical user interface element.

If the developer did not associate the data source or data target information with a particular block diagram node or terminal, then the generated source code portion (e.g., one or more DataSocket or other nodes) may be automatically included in the block diagram, but may not be connected to other elements of the block diagram. For example, a DataSocket primitive node may be programmatically included in the block diagram and configured to connect to the specified URL, but may not be connected to other graphical source code already present in the block diagram. The developer may then connect the generated source code portion to other elements of the block diagram as desired. For example, the developer may connect the DataSocket node to other nodes in the block diagram. Alternatively, the method may prompt the developer to specify a node and/or node terminal to connect the source code portion to. For example, the developer may click on the desired node or node terminal to connect to, or the developer may be presented with a selectable list of the possible connection points from which to choose.

In other embodiments, the graphical program may be configured to interface with the data source or target in ways other than generating and placing source code in the block diagram. For example, the functionality of receiving the data from the data source or writing the data to the data target may not be explicitly displayed on the block diagram. For example, the method may store information regarding the data connection to the data source or data target in a data structure associated with the specific block diagram element which receives data from the data source or provides data to the data target. When the graphical program is compiled, for example, the compiler may use this connection information to enable the graphical program to interface with the data source or target, such that the associated block diagram element receives data from the data source or writes data to the data target during program execution. The developer may view or change the data connection information at edit time, for example, by right-clicking on the block diagram element to display a user interface dialog box.

Once the graphical program has been automatically configured to interface with the data source or target, the graphical program may be executed. During program execution, the graphical program is operable to automatically, i.e., programmatically, determine and use an appropriate protocol for interfacing with the data source/target, such as HTTP, FTP, SNMP, DSTP, etc.

If the developer configured the graphical program to subscribe to data from a data source, then the program may connect to or open the data source, using an appropriate protocol or access method, and receive data from the data source. This data may then be provided to the block diagram element with which the developer associated the data source. The data may then be processed according to the functionality of this block diagram element.

If the developer configured the graphical program to publish data to a data target, then the program may connect to or open the data target, using an appropriate protocol or access method, and send or write data from the block diagram element with which the developer associated the data target.

The above-described method may enable a developer to easily enable a graphical program to interface with various types of data sources and targets. By simply receiving user input specifying a URL, specifying whether the URL references a data source or data target, and/or specifying a block diagram element, the method may automatically configure the graphical program. As described, the user may specify this information at a high level, e.g., using by using point-and-click or drag-and-drop techniques and/or by interacting with various user interface dialogs. Thus, the graphical program may be programmatically configured to interface with the data source or data target, without the developer having to program this functionality, e.g., without having to specify or write any source code.

Figure 10:
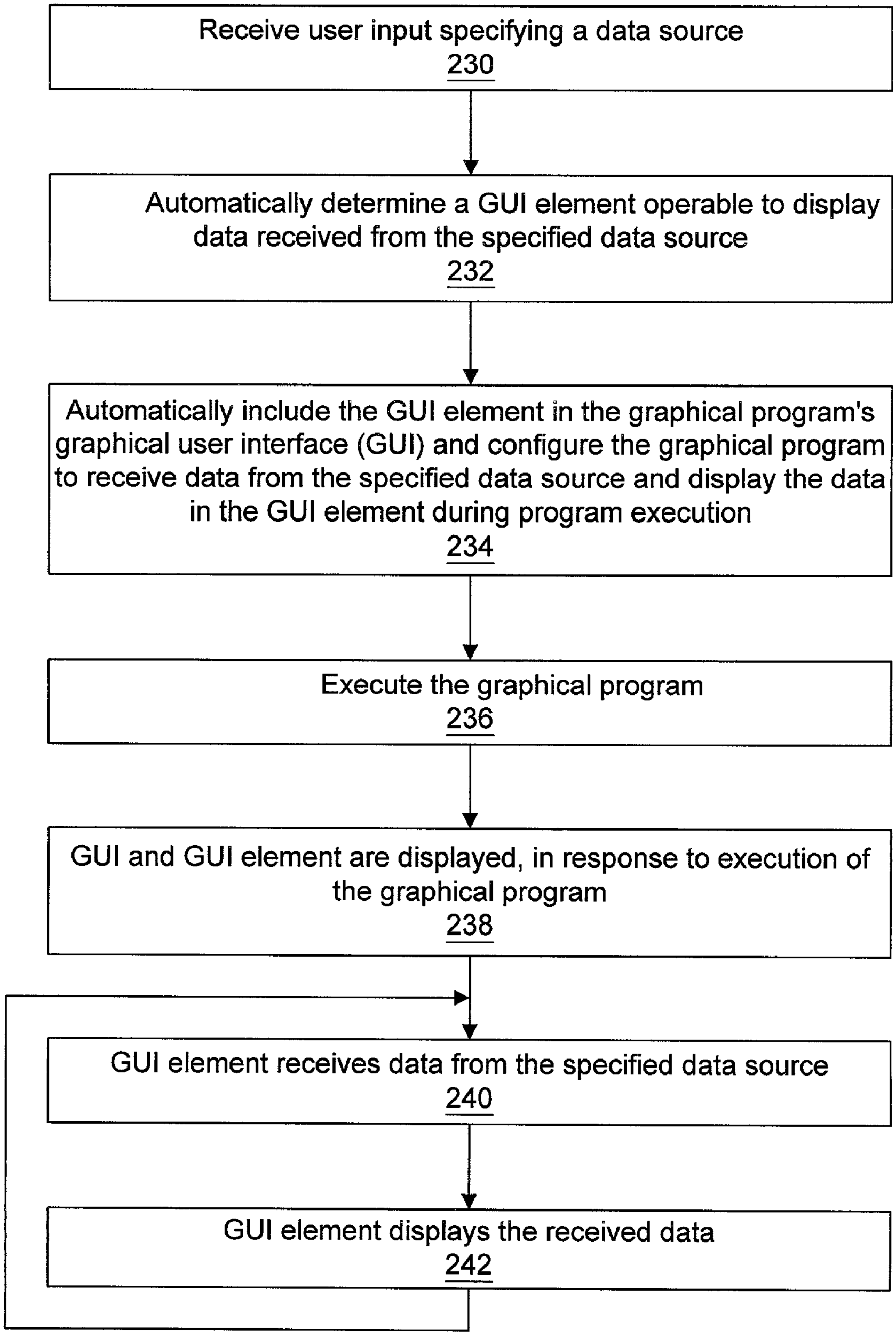
FIG. 10 is a flowchart diagram illustrating one embodiment of a method for creating and executing a graphical program including a GUI element configured to receive data from a data source and indicate the data to the user.

FIG. 10—Automatic Configuration to Display Data in a GUI Element

In many applications, the data received from a data source or provided to a data target may be associated with a graphical user interface (GUI) element in the graphical program. As described above, a graphical program may include a graphical user interface or front panel which displays various GUI elements, such as controls to provide user input to the graphical program and/or indicators to display output from the graphical program. One embodiment of the invention comprises a system and method for enabling a graphical program to receive and display data from a data source in a GUI element or to write data associated with a GUI element to a data target.

FIG. 10 is a flowchart diagram illustrating one embodiment of a method for creating and executing a graphical program including a GUI element configured to receive data from a data source and indicate the data to the user. The developer of the program can easily and quickly configure the program to receive various types of data from various types of data sources and display the data, and this configuration preferably does not require the developer to program the functionality of receiving and displaying the data. For example, the developer preferably does not have to specify or write any source code to implement this functionality.

Figure 11:
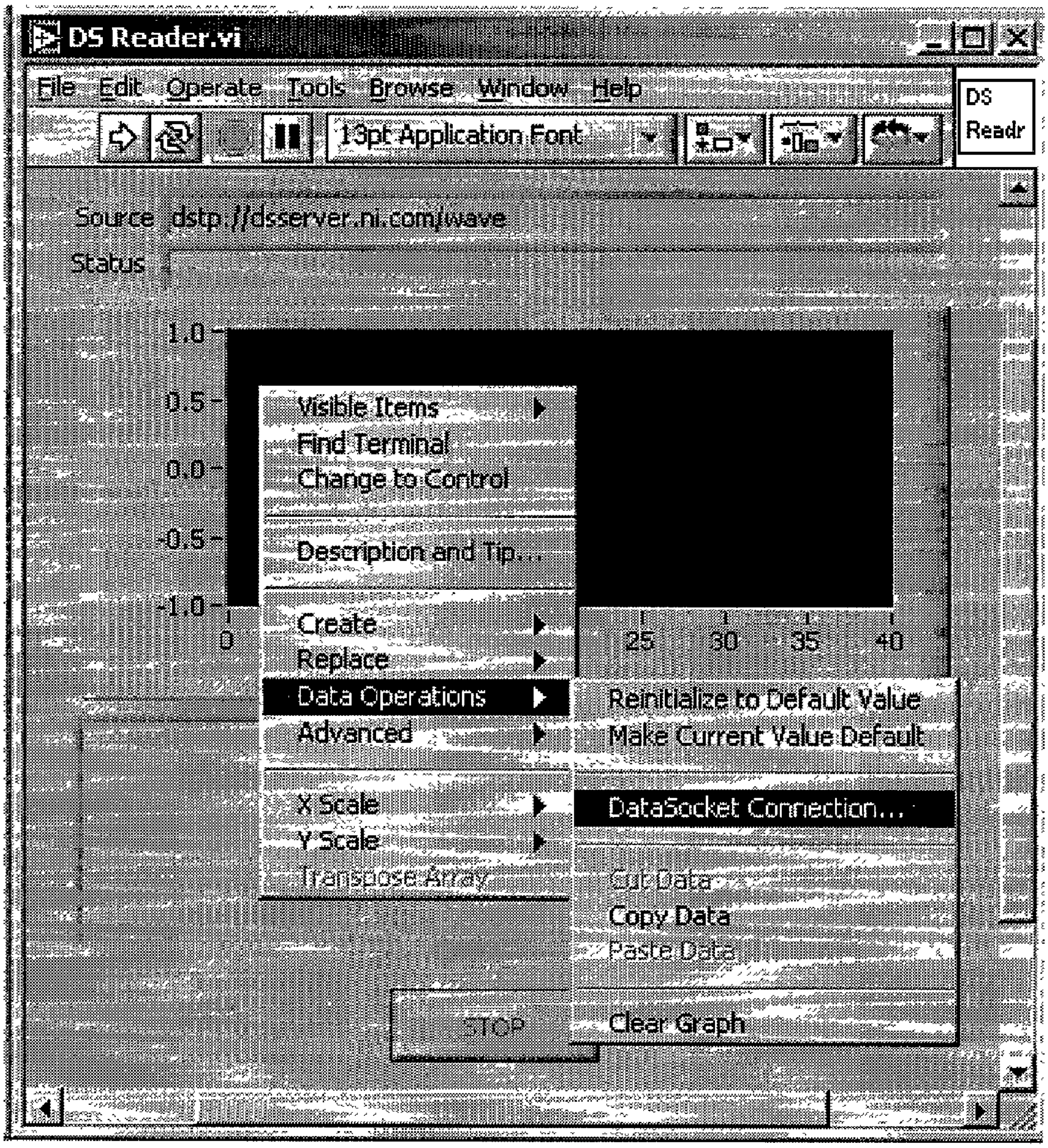
FIG. 11 illustrates a popup menu displayed by right-clicking on a GUI element, which may be used to invoke a dialog box for specifying data connection information for the GUI element.

In step 230, user input specifying a data source may be received. In various embodiments the data source information may be received in any of various ways. For example, many programming environments include a user interface editor or window for designing a graphical user interface. The developer may interact with the user interface editor window to specify the data source. For example, the developer may drag and drop an icon representing the data source, such as a URL icon or file icon, onto the window, or the developer may paste in data source information, e.g., a URL, from the clipboard. The developer may also invoke a user interface dialog for specifying the data source, similarly as described above. For example, as illustrated in FIG. 11, the developer may right-click on a GUI element to display a popup menu for invoking the user interface dialog.

The user input specifying the data source may also be received from the context of the graphical program's block diagram. In various embodiments, a graphical program's block diagram may include block diagram elements representing or corresponding to GUI elements. Thus, the developer may associate the data source information with a GUI block diagram element, e.g., by right-clicking on the GUI block diagram element to invoke a dialog box as described above.

In the above description, the developer associates the data source with an existing GUI element. In another embodiment, the GUI element may not yet exist, and the method may be operable to determine an appropriate GUI element to automatically include in the graphical program's GUI, wherein the GUI element is operable to display data received from the specified data source, as shown in step 232. For example, when the developer specifies the data source information, he may also specify that the data source should be associated with a new GUI element. As described below, the method may automatically determine an appropriate GUI element to include in the GUI. Alternatively, the method may prompt for user input specifying a desired GUI element to include in the GUI.

In various embodiments, any of various types of GUI elements may be available for inclusion in the graphical program's graphical user interface, e.g., depending on which GUI elements are supported by a particular graphical programming environment. For example, various graphical programming environments may support GUI elements such as graphs, text boxes, check boxes, knobs, etc., among various other types of GUI elements. The application development environment may also enable the use of custom GUI elements. For example, some application development environments enable the use of custom GUI elements packaged as ActiveX controls.

Figure 2:
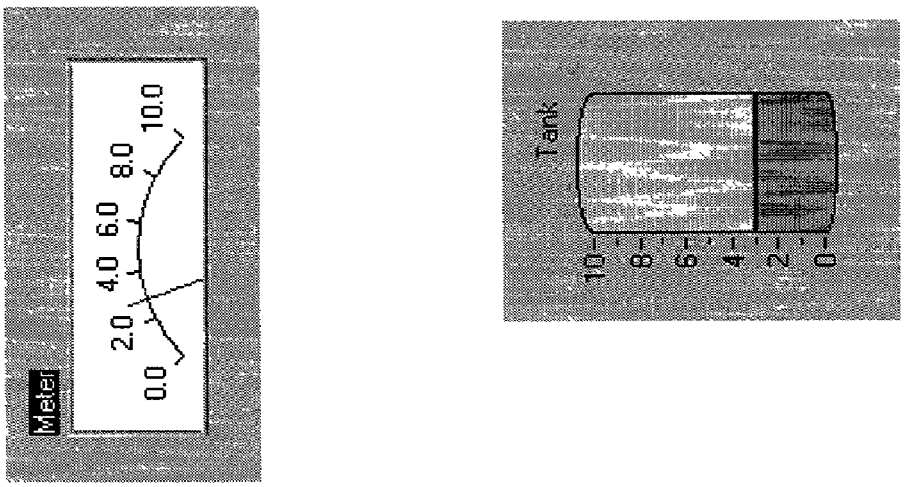
Figure 2:
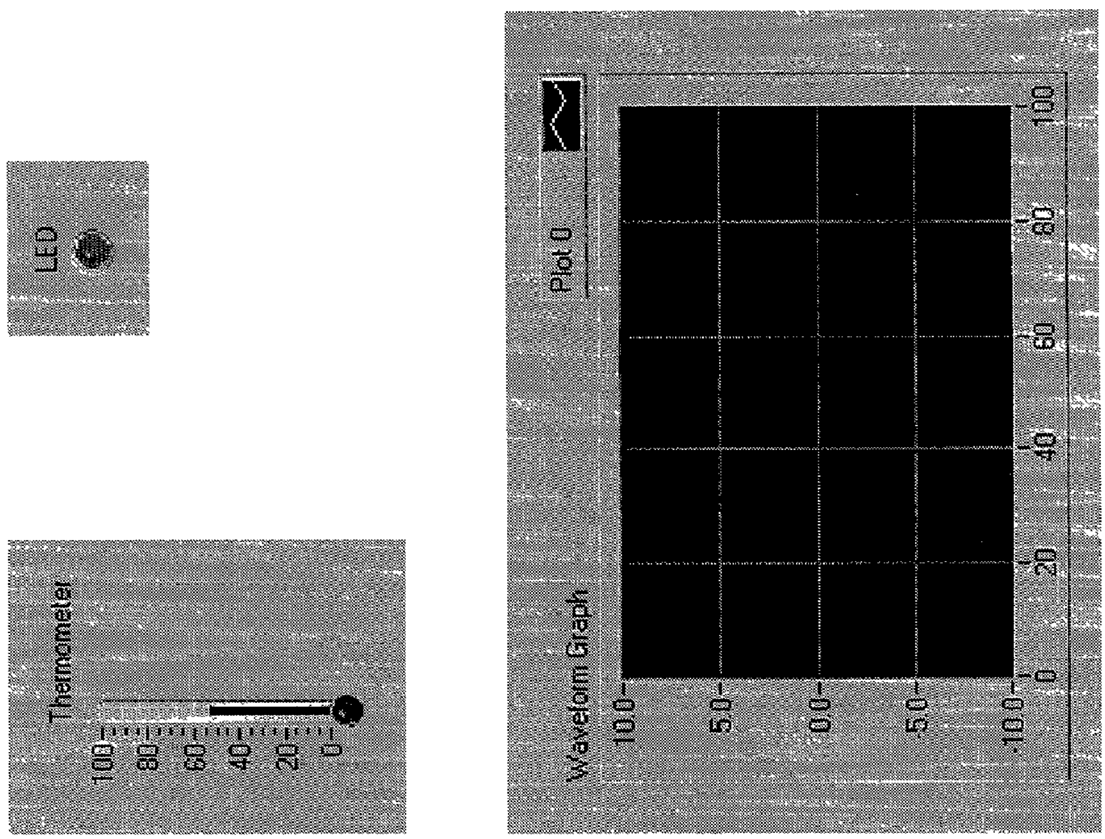

A GUI element may be operable to indicate data to the user in various ways. For example, FIG. 1 illustrates a chart GUI element operable to display a two-dimensional chart of data. FIG. 2 illustrates GUI elements that indicate data in other ways. For example, FIG. 2 illustrates a thermometer GUI element that indicates numeric data by adjusting the height of a red column, an LED GUI element that indicates Boolean data by displaying a light turned on or off, a meter GUI element that indicates numeric data by adjusting the position of a needle, etc. If a custom GUI element is used, such as an ActiveX control, the GUI element may define its own behavior for indicating data to the user. In addition to displaying data to the user, various GUI elements may also indicate data in other ways, e.g., by sending audio signals to a sound device. A GUI element may indicate discrete or continuous data. For example, in FIG. 1, the chart display may change continuously as new data is constantly received, while in FIG. 2, the LED light may change only occasionally, e.g., to indicate a Boolean change in the state of a variable that occurs only occasionally.

Any of various techniques may be used in determining an appropriate GUI element for subscribing to data received from a data source. If the data source is a server (or is located on a server), the method may automatically connect to the server and receive data from the server. The appropriate GUI element to include in the program's GUI may then be determined based on the data received. Any of various types of data may be associated with a data source, such as strings, scalars, Booleans, waveforms, etc.

As well known in the art, the beginning portion of a URL specifies an access protocol. For example, the URL "http://www.ni.com/map.htm" specifies the hypertext transfer protocol (HTTP) as an access protocol. In one embodiment, a data source/target may be accessed using a protocol that supports self-describing data. One example of such a protocol, the DataSocket Transport Protocol (DSTP) is discussed below. The DSTP protocol is used when interfacing with a type of server described herein, referred to as a DataSocket server. As an example, the data source URL may be a URL such as "dstp://dsserver.ni.com/wave", and data received from this data source (i.e., received from the DataSocket server when accessing this data source) may be two-dimensional waveform data. For example, the data may comprise live waveform data that is generated in real time. Since the data is received in a self-describing format, the method may determine that an appropriate GUI element for displaying the data would be a chart GUI element.

In some cases, more than one GUI element may be operable to display the data received from a data source. Thus, in one embodiment, the method may present the developer with a list of items or icons corresponding to the possible GUI elements, and the developer may select which one to use. Alternatively, the method may select one of the GUI elements to use, without receiving user input. For example, the selection of default GUI elements to use for various types of data may be user-configurable.

In some cases it may not be possible to determine an appropriate GUI element by examining data received from the data source. For example, the access protocol used may not support self-describing data. In this case, it may be possible to determine an appropriate GUI element based on other information. For example, if the URL specifies a file name, the GUI element may be determined based on the file extension. For example, if the URL specifies a file such as "ftp://ftp.ni.com/wave1.wav" then the method may determine that the data is waveform data, based on the ".wav" file extension. Thus, a chart GUI element may be used to display this waveform data.

If it is not possible to automatically determine an appropriate GUI element, then the method may prompt for user input. For example, the method may display a user interface dialog or window enabling the developer to easily select which GUI element to associate with the specified data source.

In step 234, the GUI element determined for displaying the data may be automatically, i.e., programmatically included (displayed) in the program's graphical user interface. For example, the GUI element may be included or displayed on a graphical user interface panel or window associated with the program. In step 234, the graphical program may also be automatically, i.e., programmatically configured to receive data from the specified data source and display the data in the GUI element during program execution.

Automatically including (displaying) the GUI element in the GUI of the graphical program may comprise including a block diagram element corresponding to the GUI, e.g., a node (also referred to as a user interface terminal), in the block diagram of the graphical program. Similarly as described above, a graphical source code portion (e.g., one or more nodes, such as a single DataSocket node) that implements receiving data from the data source may be programmatically generated, and this source code portion may be connected to the GUI block diagram element. For example, a DataSocket node may be programmatically included in the block diagram, and this node may be programmatically connected to the GUI block diagram element in the block diagram. Also, as described above, the GUI block diagram element may be configured to interface with the data source without explicitly showing source code for this functionality on the block diagram, e.g., such that the developer can invoke a configuration dialog to view or edit the configuration information for the GUI block diagram element.

The implementation of configuring the graphical program in step 234 may depend on the particular graphical programming environment being used. In one embodiment, no source code is added to the graphical program in performing this configuration. For example, the method may store information regarding the data source connection in a data structure. When the graphical program is compiled (if applicable), for example, the compiler may use this connection information to enable the graphical program to dynamically connect to the data source and provide data received from the data source to the GUI element. For example, the graphical program may launch a separate thread to perform this task. In another embodiment, the method may automatically alter the graphical source code of the program in order to enable the GUI element to receive and display the data from the data source. For example, the method may automatically generate one or more nodes to connect to the data source, receive data from the data source, and pass the data to the GU element.

In one embodiment, performing step 234 may utilize a separate layer or component specialized for exchanging data with various types of data sources and targets. One such component, referred to as a "DataSocket", is described in the above-incorporated patent application titled, "DataSocket System and Method for Accessing Data Sources Using URLs". An overview of the DataSocket system is also given below.

In one embodiment, once a GUI element has been determined and included in the program's graphical user interface, the developer may be allowed to easily change the GUI element to a new type of GUI element. For example, if a first GUI element was automatically determined and included in the GUI, the developer may override this choice by changing the first GUI element to a new type of GUI element, e.g., by right-clicking on the first GUI element or on a block diagram node corresponding to the first GUI element and selecting a popup menu item to change the type.

In one embodiment, the decision of which GUI element to include in the program's GUI may be deferred until the program is executed, or the GUI element may be changed to a new type during program execution. For example, it may not be possible to connect to a data source during program development. Also, the type of data associated with the data source could change from development time to runtime. Thus, in these cases it may be desirable to examine the data at runtime and select an appropriate GUI element dynamically.

In step 236, the graphical program may be executed.

In step 238, the graphical user interface of the graphical program may be displayed, in response to execution of the program. For example, depending on a particular development environment, the graphical program may include source code for displaying the GUI, or the GUI may be automatically displayed when the program is executed. In step 238, the GUI element created and configured as described above may be displayed on the GUI.

In step 240, the GUI element may receive data from the data source specified in step 230. As described above, the program may be operable to connect to the data source and pass data to the GUI element in various ways.

In step 242, the GUI element may indicate the data received in step 240, e.g., by displaying the data or by altering the way in which the GUI element is displayed. The GUI element may indicate the data in any of various ways. For example: a chart GUI element that receives a continuous stream of numeric data may display a scrolling chart of the data; a knob GUI element that receives a numeric value may alter the appearance of the knob to illustrate that the knob is currently set to the received value; an LED GUI element that receives a Boolean value may alter the appearance of the LED light to appear to be turned on or off; etc.

Depending on the type of data source, steps 240 and 242 may be performed multiple times, as indicated by the flowchart arrow from step 242 to step 240. For example, if the data source is a DataSocket server, the program may maintain a continuous network connection with the DataSocket server and may periodically or continuously receive new data from the DataSocket server and pass the new data to the GUI element for display. For other types of data sources, such as a file, steps 240 and 242 may only be performed once.

As noted above, in an alternative embodiment, instead of first specifying a data source, the developer may first include a GUI element in the program's GUI and may then configure the GUI element to subscribe to data from a data source, e.g., by invoking a user interface dialog for specifying a URL for a data source to which to subscribe, e.g., as shown in FIG. 11. Thus, in one embodiment, the developer may include the desired GUI element in the program's GUI manually instead of the GUI element being selected and included automatically as described above. The method may then automatically configure the program to receive data from the data source and display the data in the GUI element, as described above.

Figure 12:
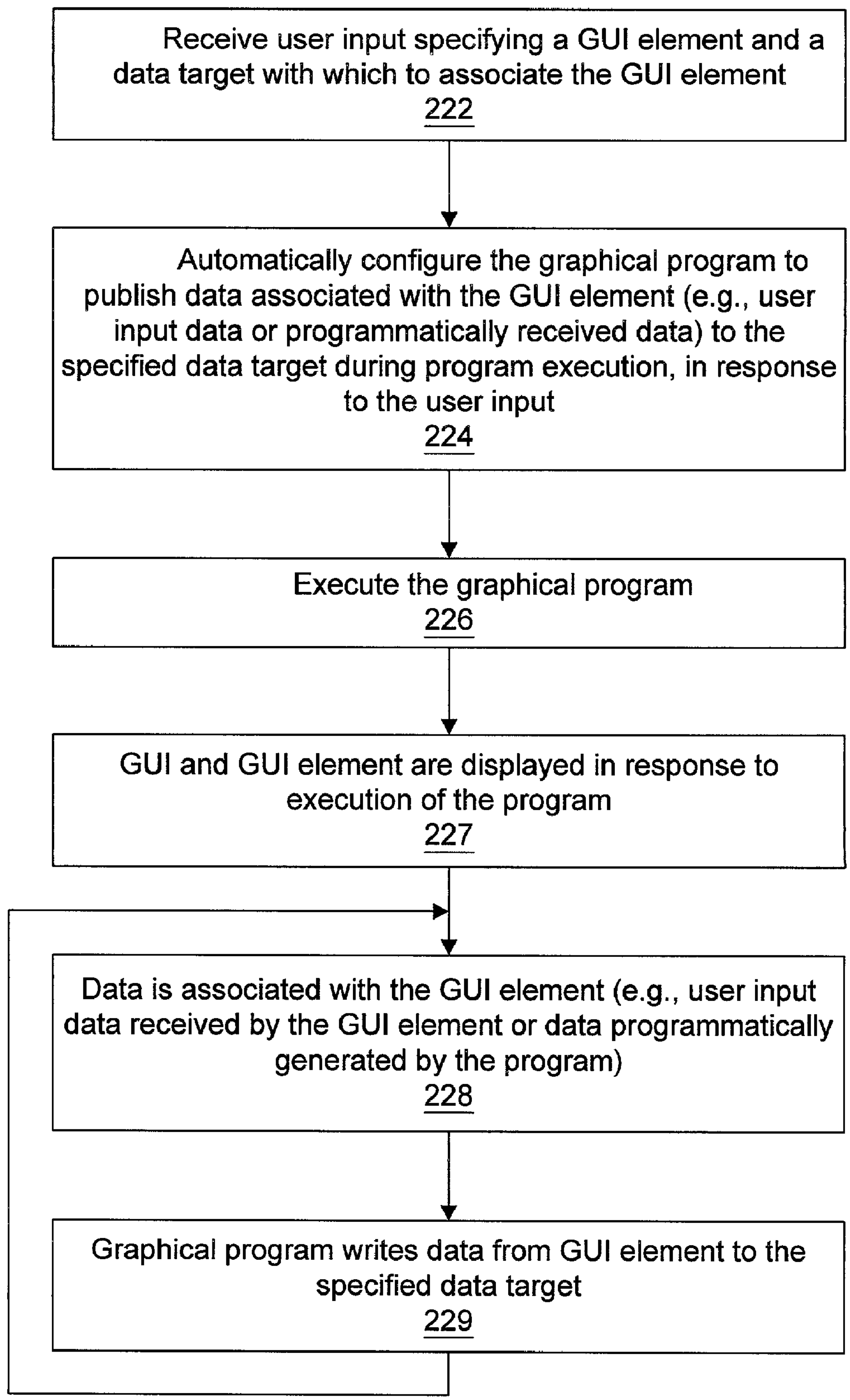
FIG. 12 is a flowchart diagram illustrating one embodiment of a method for creating and executing a graphical program including a GUI element configured to publish data to a data target.

FIG. 12—Program with a GUI Element Configured to Publish to a Data Target

FIG. 12 is a flowchart diagram illustrating one embodiment of a method for creating and executing a graphical program including a GUI element configured to publish data to a data target.

In step 222, user input specifying a GUI element and a data target with which to associate the GUI element may be received, similarly as described above. Receiving this user input specifying the data target preferably does not include receiving user input specifying source code for the program. In other words, the developer can specify a data target with which to associate the GUI element without having to specify any source code. The developer may, for example, interact with a dialog box such as shown in FIG. 9, to simply specify a "Publish" option, since the GUI element should publish data to a data target. A data target may be specified by a URL, similarly as for a data source.

In step 224, the method may operate to programmatically configure the graphical program to publish data associated with the GUI element to the specified data target during program execution. In other words, the program may be configured to connect to the data target and write data associated with the GUI element to the data target during program execution. The implementation of step 224 may depend on the graphical programming environment being used. In one embodiment, no graphical source code is added to the program in performing this configuration. For example, the method may store information regarding the data target connection in a data structure. When the graphical program is compiled, for example, the compiler may use this connection information to enable the program to dynamically connect to the data target and write the GUI element data to the data target. For example, the graphical program may launch a separate thread to perform this task. In another embodiment, the method may automatically alter the graphical source code of the program in order to enable the GUI element data to be written to the data target. For example, the method may automatically generate one or more nodes to obtain data from the GUI element, connect to the data target, and write the data to the data target. For example, as noted above, a single node may be programmatically included in the graphical program block diagram, such as a DataSocket node, which performs the function of writing data to the data target.

In one embodiment, performing step 224 may utilize a separate layer or component specialized for exchanging data with various types of data sources and targets. One example of such a layer, which utilizes a component referred to as a "DataSocket", is described below.

In step 226, the graphical program may be executed.

In step 227, the graphical user interface of the graphical program may be displayed, in response to execution of the graphical program. For example, the graphical program may include source code for displaying the GUI, or the GUI may be automatically displayed when the graphical program is executed. In step 227, the GUI element configured in steps 222–224 may be displayed on the GUI.

In step 228, data may be associated with the GUI element, e.g., during execution of the graphical program. Any of various types of data may be associated with the GUI element, e.g., depending on the type of GUI element. For example, a text box GUI element may have text string data, whereas a knob GUI element may have a numeric value as data. The GUI element may receive this data in various ways, e.g., programmatically or as user input.

In step 229, data from the GUI element may be written to the specified data target. As described above with reference to step 224, the method may obtain the GUI element data and write the data to the data target using any of various techniques or formats appropriate for the type of data and/or GUI element. Depending on factors such as the type of data or GUI element, steps 228 and/or 229 may be performed multiple times, as indicated by the flowchart arrow looping from step 229 to step 228. For example, if the GUI element is a chart that programmatically receives and displays a stream of numeric data, the program may write data from the GUI element to the data target in a continuous stream.

In the above description, a developer may first display a GUI element and may then specify a data target with which to associate the GUI element. It is noted that in an alternative embodiment, the developer may first specify the desired data target, and the method may operate to automatically, i.e., programmatically, determine a GUI element determine a GUI element appropriate to provide data to the specified data target, e.g., based on a file extension of the data target, if applicable, or based on information in a URL referencing the data target. For example, the method may be operable to maintain or access data on which types of GUI elements were used in the past in connection with which types of data targets. In another embodiment, the method may prompt for user input specifying a GUI element to use, in response to receiving the data target information.

Figure 13:
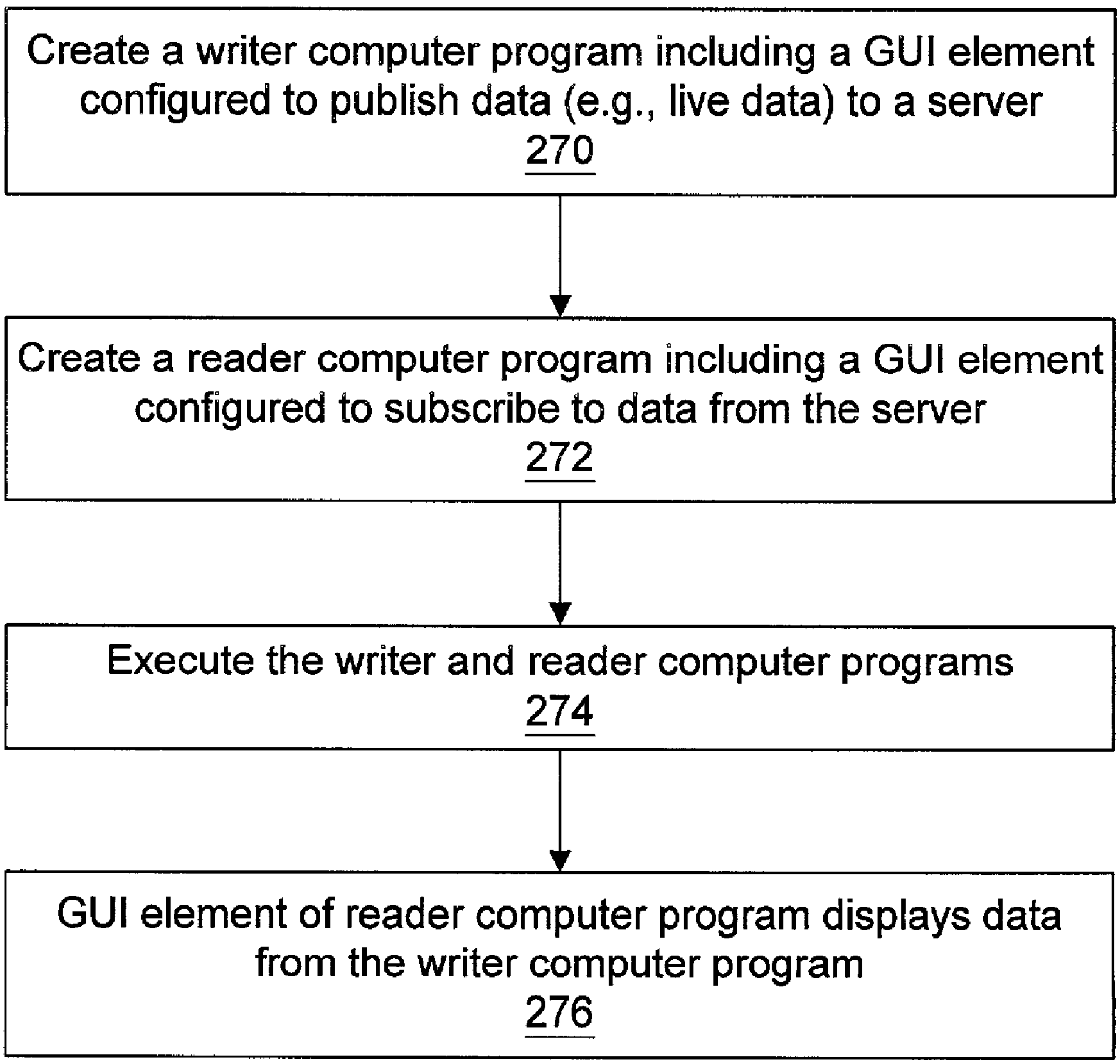
FIG. 13 is a flowchart diagram illustrating one embodiment of a method for exchanging data between a writer and a reader program, wherein the program developer(s) is not required to specify any source code to perform this data exchange.

FIG. 13—Exchanging Data between a Writer and Reader Program

FIG. 13 is a flowchart diagram illustrating one embodiment of a method for exchanging data between a writer and a reader program, wherein the program developer(s) is not required to specify any source code to perform this data exchange.

In step 270, a writer graphical program may be created, wherein the writer program includes a GUI element configured to publish data to a server, e.g., a server program or process. For example, the GUI element of the writer program may be configured as described above, e.g., by specifying a URL of the server and configuring the GUI element to publish data associated with the GUI element to this URL.

In step 272, a reader graphical program may be created, wherein the reader program includes a GUI element configured to subscribe to data from the server. For example, the GUI element of the reader program may be configured as described above, e.g., by specifying a URL of the server and configuring the GUI element to subscribe to data referenced by this URL.

In step 274, the writer and reader programs may be executed. The writer and reader programs may execute on the same computer or on different computers, e.g., computers connected via a network. The server program may execute on one of these computers or may execute on a different computer.

In step 276, the GUI element of the reader program displays (or otherwise indicates) data from the writer program. The exchange of data from the writer program to the reader program via the server program may be implemented in various ways. One embodiment of this is described below.

FIG. 13 illustrates one embodiment of a method for exchanging data between a writer and a reader program. As noted above, it is not necessary to use a reader program having a GUI element configured to subscribe to data together with a writer program having a GUI element configured to publish data. For example, the writer or reader program may not have a graphical user interface, or a writer or reader program may interact with a data target/source such as a file.

Figure 15:
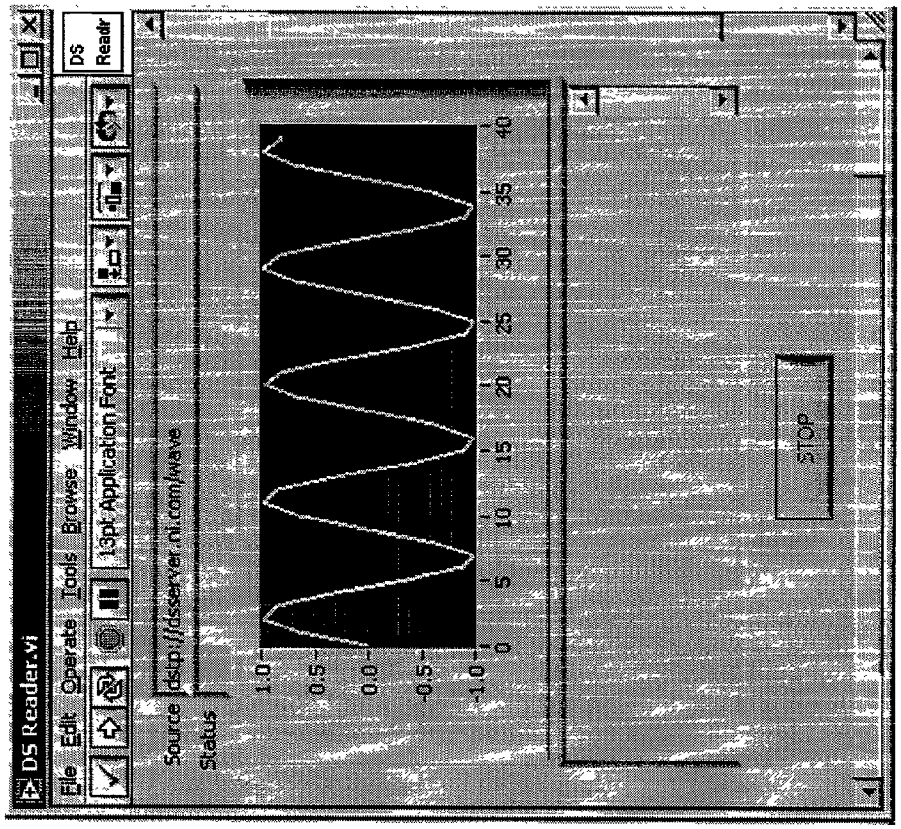
FIGS. 14 and 15 illustrate graphical user interface panels for a writer program and a reader program, respectively, wherein each GUI panel includes a chart GUI element configured with a data connection.
Figure 14:
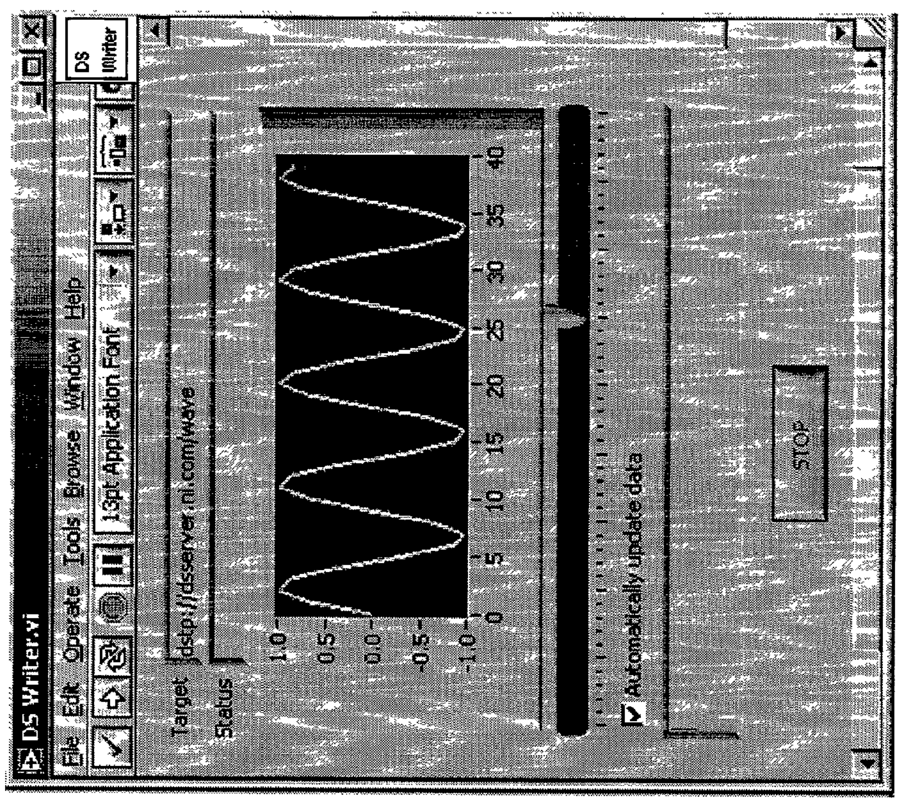

FIGS. 14–15: Example

FIGS. 14 and 15 illustrate graphical user interface panels (or front panels) for a writer graphical program and a reader graphical program, respectively. Each GUI panel includes a chart GUI element configured with a data connection as described above. The chart in the FIG. 14 writer program GUI panel is configured with a data connection to publish data to a data target. The chart in the FIG. 15 reader program GUI panel is configured with a data connection to subscribe to data from this data target. For example, the chart GUI element of the writer graphical program may be configured according to the dialog box illustrated in FIG. 9, and the chart GUI element of the reader program may be configured according to the dialog box illustrated in FIG. 8. As shown in FIGS. 8 and 9, the data target of the writer program and the data source of the reader program are the same. In this case, the data source/target is a DataSocket server. The programs interface with the DataSocket server using a protocol referred to as the DataSocket Transfer Protocol (DSTP), which is indicated by the "dstp://" portion of the URLs.

FIGS. 14 and 15 illustrate a snapshot of the two GUI panels during program execution. The writer graphical program is operable to generate a continuous stream of numeric waveform data and display this stream of waveform data in the chart. As the chart receives and displays the data, the data is also published to the DataSocket server. The writer and reader programs may execute on different computers, and the DataSocket server may execute on one of these computers or on a different computer.

The reader graphical program may be operable to determine that new data was written to the DataSocket server in any of various ways. In one embodiment, the reader program connects to the DataSocket server when the GUI is displayed and receives new data as the data is written to the DataSocket server, e.g., via a DataSocket component that interfaces with the DataSocket server. The reader program may then provide the data for display in the chart GUI element of the reader program. In other embodiments, the coordination of data exchange between the writer and reader programs may be implemented in any of various other ways.

Figure 16:
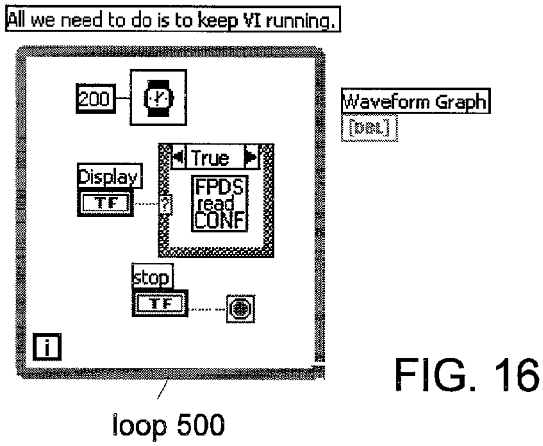
FIG. 16 illustrates one embodiment of a graphical program block diagram corresponding to the reader program GUI panel illustrated in FIG. 15.
Figure 17:
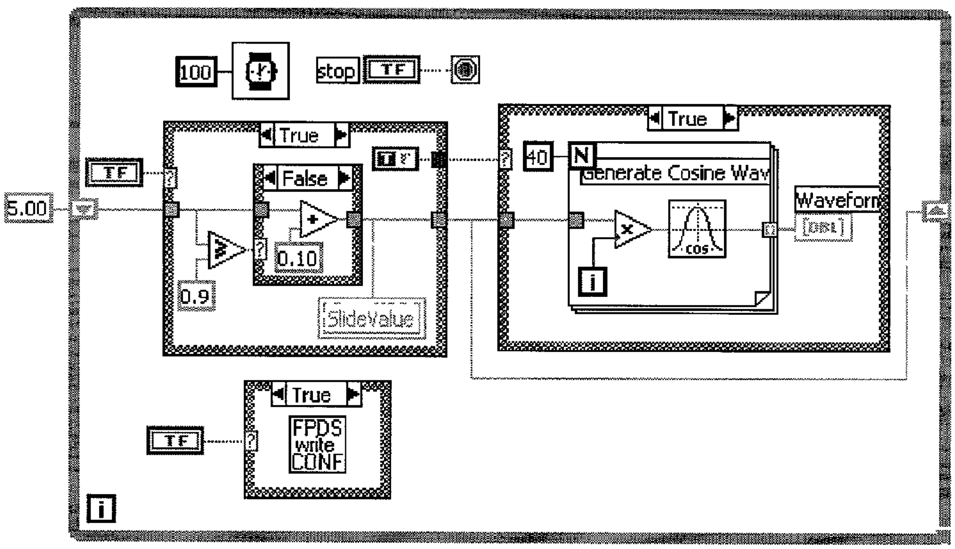
FIG. 17 illustrates one embodiment of a graphical program block diagram corresponding to the writer program GUI panel illustrated in FIG. 14.

As described above, the developer may configure the writer and reader programs to exchange and display live data very easily, e.g., using simple dialog boxes, without specifying any source code. FIGS. 16 and 17 illustrate an embodiment in which the writer and reader programs, respectively, are graphical programs created using the LabVIEW graphical programming environment.

FIG. 16 illustrates one embodiment of a graphical program block diagram corresponding to the reader program GUI panel illustrated in FIG. 15. In this example, the block diagram includes a node labeled "Waveform Graph" that represents the chart GUI element of FIG. 14. This node may be automatically included in the block diagram when chart GUI element is included in the program's GUI. The graphical program of FIG. 16 is operable to receive data written to the server by the writer program and display the data in the chart GUI element. However, the chart GUI element node is not connected to any other elements in the block diagram, illustrating that the developer did not need to specify any graphical source code for the block diagram to enable the chart GUI element to receive and display the desired data.

In addition to the chart GUI element node, the reader program block diagram of FIG. 16 also includes a programmatic loop element 500. When the program executes, the graphical code inside the loop is executed until the user presses the "Stop" button shown on the FIG. 15 GUI panel. As described above, the writer program is operable to write a continuous stream of numeric waveform data to the server. Thus, the programmatic loop enables the reader program to execute indefinitely. While the reader program executes, the data is received from the server and displayed in the chart GUI element. As discussed above, for example, a separate thread may be responsible for handling the exchange and display of this data.

In one embodiment, the graphical programming environment may be operable to automatically generate graphical code such as the programmatic loop element 500 and the graphical code inside the loop. For example, the developer may specify the URL of the server data source, and in response, the chart GUI element may be automatically included in the program's GUI and configured to subscribe to the server data. The developer may then request the graphical programming environment to automatically generate code such as the loop code shown in FIG. 16. This would allow the developer to create an entire graphical program to receive and display live data continuously from a data source, without having to specify any source code for the program at all. This may be useful, for example, to enable users to quickly connect to various data sources and monitor data, with no programming involved. For example, a user may easily monitor real-time measurement data acquired by an instrument located in a remote laboratory.

FIG. 17 illustrates one embodiment of a graphical program block diagram corresponding to the writer program GUI panel illustrated in FIG. 14. Similarly as described above, the block diagram includes a node labeled "Waveform" that represents the chart GUI element of FIG. 14. In this case, the chart GUI element node is connected to another node in the block diagram. However, this connection is for providing waveform data generated by the Cosine Wave function node to the chart GUI element. The block diagram does not include any graphical source code for writing the chart GUI element data to the server. As described above, this data connection information may be specified via a user interface, e.g., via a dialog box, without the developer specifying graphical source code to implement this functionality.

Figure 18:
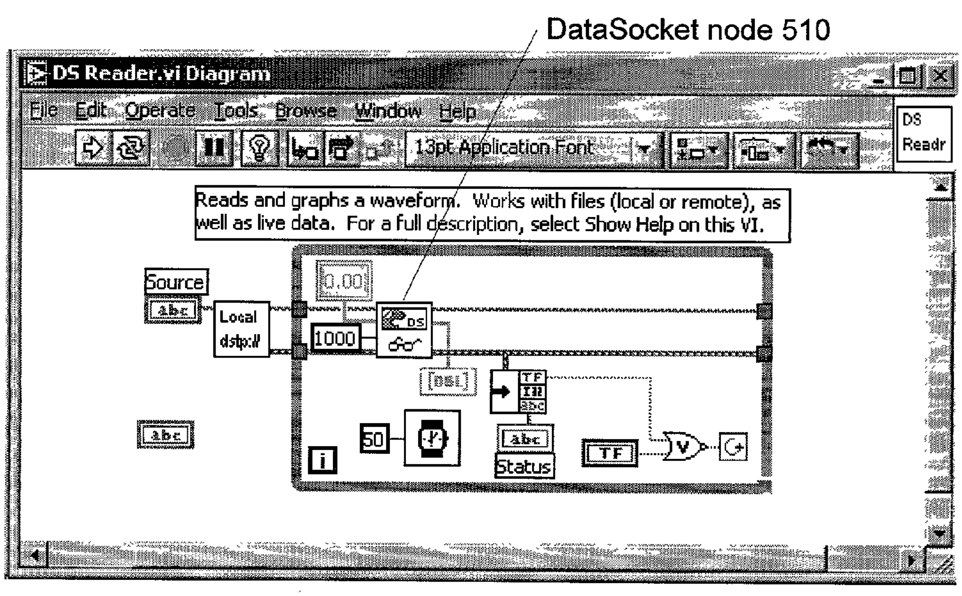
FIG. 18 illustrates another embodiment of a graphical program block diagram corresponding to the reader program GUI panel illustrated in FIG. 15.

In the examples of FIGS. 16 and 17, the program may implement the connection from a GUI element to a data target or source "behind the scenes" of the block diagram. In other words, source code indicating this connection does not appear on the block diagram. In another embodiment, it may be desirable to include source code indicating the connection on the block diagram, as described above. In this case, the source code implementing the data connection may be automatically included on the block diagram when the developer specifies the data connection information. For example, FIG. 18 illustrates another embodiment of a graphical program block diagram corresponding to the reader program GUI panel illustrated in FIG. 15. In this embodiment, the chart GUI element node is connected to another node, unlike the diagram of FIG. 15. The chart GUI element node receives data from a DataSocket node 510. This DataSocket node is configured to connect and read data from the DataSocket server referenced by the URL, "dstp://dsserver.ni.com/wave". Thus, in this embodiment, the user can view source code implementing the data connection to the data source.

In the above-incorporated patent application titled, "System and Method for Programmatically Creating a Graphical Program", a system and method for programmatically generating a graphical program is described. For example, various code generation wizards or tools may use this ability to automatically generate a graphical program, e.g., to implement a prototype created by a user, to implement a state machine diagram specified by a user, etc. If desired, this system and method may be utilized to programmatically generate a graphical program that includes a GUI element configured with a data connection to a data source or target. For example, it may be desirable to enable a tool to generate a graphical program to implement a user-specified prototype, wherein the block diagram of the program includes no code or a minimal amount of code related to data input/output with external data sources/targets, e.g., in order for the user to be able to better understand the operation of the block diagram.

This system and method may also be used to add source code to an existing graphical program, e.g., to create the graphical program of FIG. 18, wherein a GUI element node is connected to other nodes in the block diagram.

FIGS. 19–22: Specifying Data Connection Information

Figure 19:
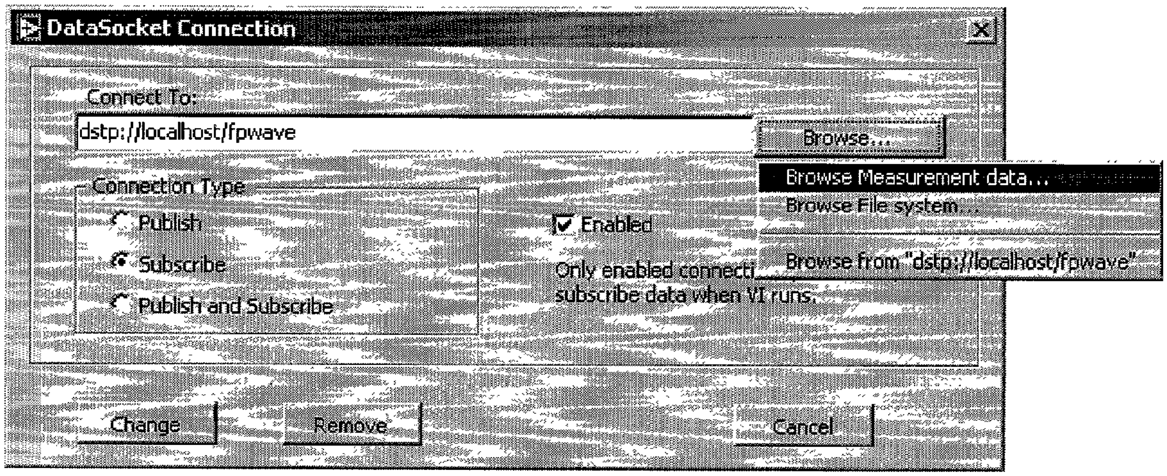
FIG. 19 illustrates the dialog box of FIG. 8, in which the user utilizes a browse feature to choose a data source or target.
Figure 20:
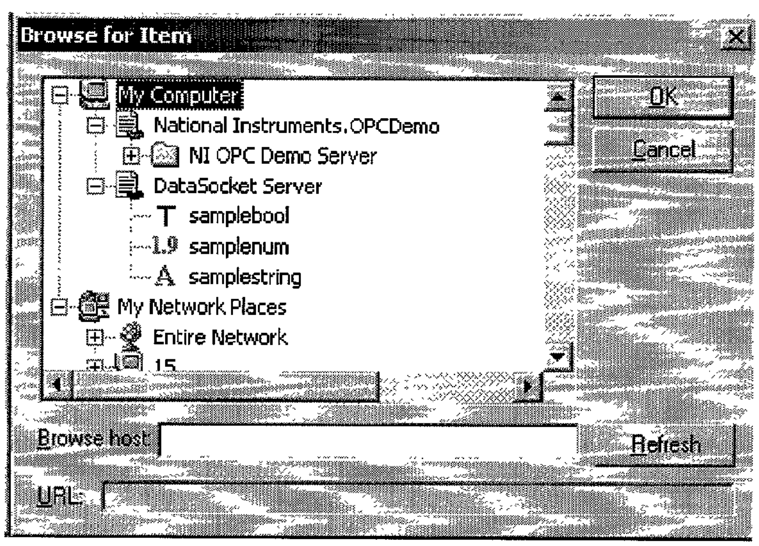
FIG. 20 illustrates a dialog box enabling the user to select from various data sources and targets associated with hardware instruments connected to the computer.

As described above, FIGS. 8 and 9 illustrate one embodiment of a dialog box for specifying data connection information for a GUI element. As shown in FIG. 19, the dialog box may include a "Browse" button enabling the developer to choose a data source or target via a graphical user interface. In this example, the user can choose to browse the file system of the host computer, which may cause a file dialog box may be displayed. As shown, the user may also choose to browse measurement data. For example, in one embodiment, the user may be able to subscribe to a hardware device as a data source or publish data to a hardware device data target. FIG. 20 illustrates a dialog box that may appear when the user selects "Browse Measurement data". This dialog box displays various data sources and targets associated with hardware instruments connected to the computer.

The dialog box of FIG. 20 also lists OPC servers available to the host computer. OPC (Object Linking and Embedding (OLE) for Process Control) is built on Microsoft ActiveX and Distributed Component Object Model (DCOM) technology. OPC servers and clients exchange real-time information among a variety of systems. OPC establishes an open industry standard for plug-and-play interoperability among disparate automation devices, systems, and software.

The user can configure a GUI element to connect to an OPC Server in the same way as any other data source. A URL identifies the OPC server item. URLs that address OPC servers start with opc: and include the following parts:

//machine__name [optional]—Identifies the computer on which the OPC server is installed.

/server__name—Specifies the OPC server to connect to.

/item__name—Specifies the OPC item on the specific OPC server.

UpdateRate=n [optional]—Specifies in milliseconds how often the OPC server should check the device for new values.

DeadBand=n [optional]—Specifies what percentage change is required before the server notifies your application of a value change.

The following is an example of a URL that reference the National Instruments OPC test server installed with the LabVIEW application:

opc://machine.ni.com/National Instruments.OPCTest/item1?UpdateRate=1000&DeadBand=10

As described in the above-incorporated U.S. patent application Ser. No. 09/374,740, titled "System and Method for Automatically Creating URLs for Accessing Data Sources and Data Targets", in one embodiment, URLs for accessing data sources and targets may be automatically generated. Various hardware devices, hardware device channels, OPC servers, etc., may be referenced by these URLs. Thus, when a user selects a data source or target associated with a hardware device from the dialog box of FIG. 20, the "Connect To" field of FIG. 19 may be populated with a URL corresponding to the data source or target. The URL may include configuration information for a device. Thus, when a program having a GUI element configured with a data connection to a hardware device data source or target executes, the device may be automatically configured.

Figure 21:
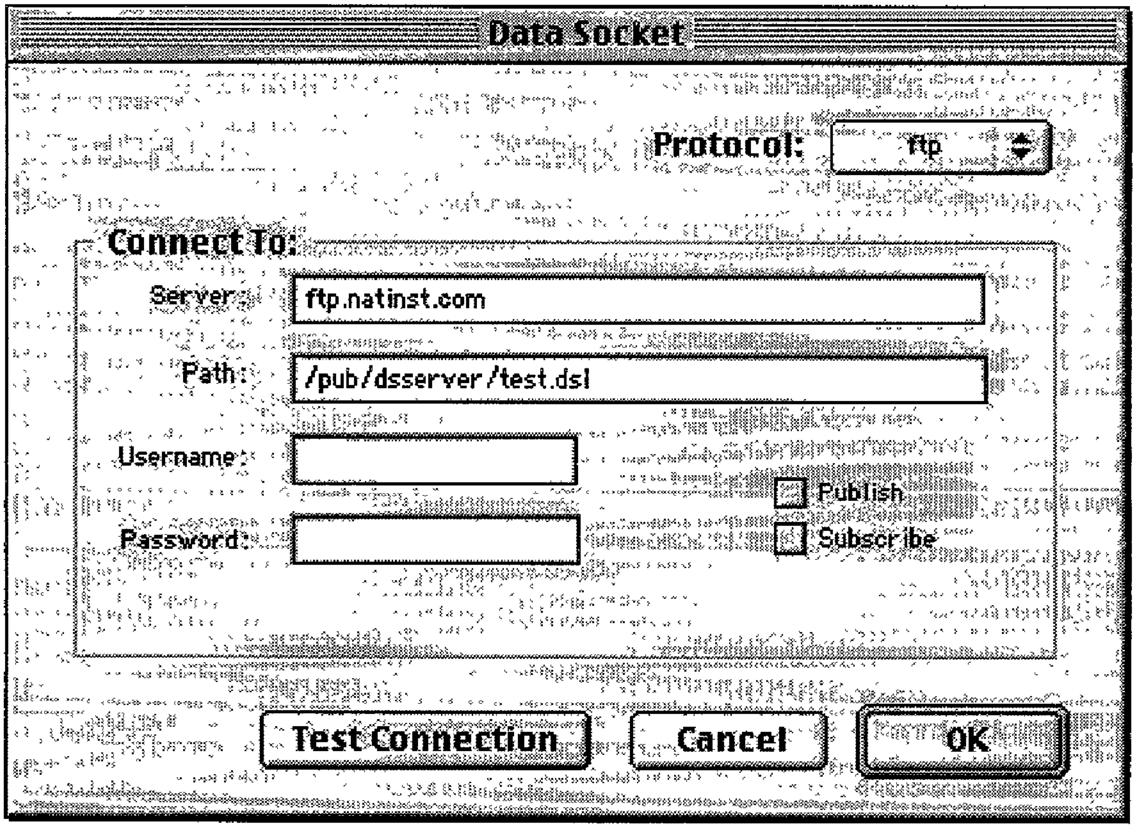
FIG. 21 illustrates an alternative embodiment of a dialog box for specifying data connection information.

FIG. 21 illustrates an alternative embodiment of a dialog box for specifying data connection information. As shown in FIG. 21, the dialog box may include a "Protocol" control allowing the user to specify a protocol to use, such as "HTTP, "FTP", etc. Other fields in the dialog box may change appropriately, depending on the selected protocol. For example, in FIG. 21 the user selected the FTP protocol, and the dialog box displays fields for entering a username and password for connecting to the FTP server.

FIG. 21 also illustrates a "Test Connection" button. This may enable the user to interactively test the connection to a data source or target, before program execution. For example, this may help to detect any errors in the specified hostname or path of a data source or target, any network connection problems, etc.

Connection Status and Data Type Issues

Figure 22:
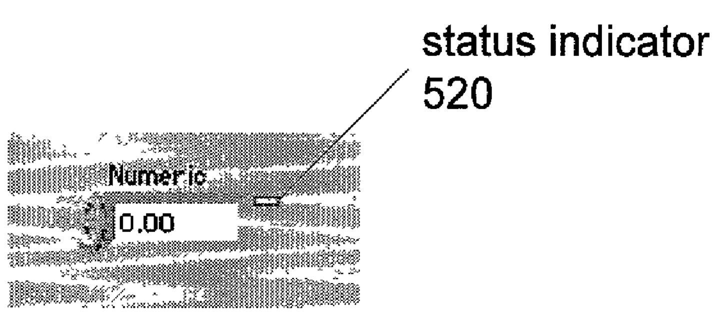
FIG. 22 illustrates a status indicator that appears beside a GUI element when a data connection for the GUI element has been specified, wherein the status indicator indicates the status of the data connection.

In one embodiment, the status of a data connection for a GUI element may be visually indicated on the GUI panel. For example, as shown in FIG. 22, a small status indicator 520 may appear beside a GUI element when a data connection for the GUI element has been specified. If the connection is valid, this indicator may be colored green during program execution, or if not, the indicator may be colored red.

An invalid connection may be caused by an error in a specified hostname or path of a data source or target, a network connection problem, etc. Also, an invalid connection may occur when a GUI element is not compatible with its configured data source or target. For example, a graphical program may be able to connect to a data source and receive data from the data source, but the data received may not be valid data for the GUI element. For example, a valid GUI element may have been automatically selected, but the user may have overridden this choice and substituted an invalid GUI element.

Any of various types of data may be associated with a data source, such as strings, scalars, Booleans, waveforms, etc. A given GUI element may only be operable to display certain types of data. For example, a chart GUI element may be able to display two-dimensional numeric waveform data, but not three-dimensional waveform data. In this case, if three-dimensional waveform data is received from a data source with which the chart GUI element is associated, an invalid connection may be indicated. As described below, in one embodiment, data may be received in a self-describing format enabling the program (or execution environment) to parse the data appropriately and determine whether the data is valid data for a particular GUI element.

In one embodiment, if the data is not valid data for the GUI element, then the program or execution environment may be operable to dynamically select a GUI element that is valid for the data, i.e., a GUI element that can receive and display the data. This GUI element may then be dynamically substituted for the original GUI element at execution time.

Figure 23:
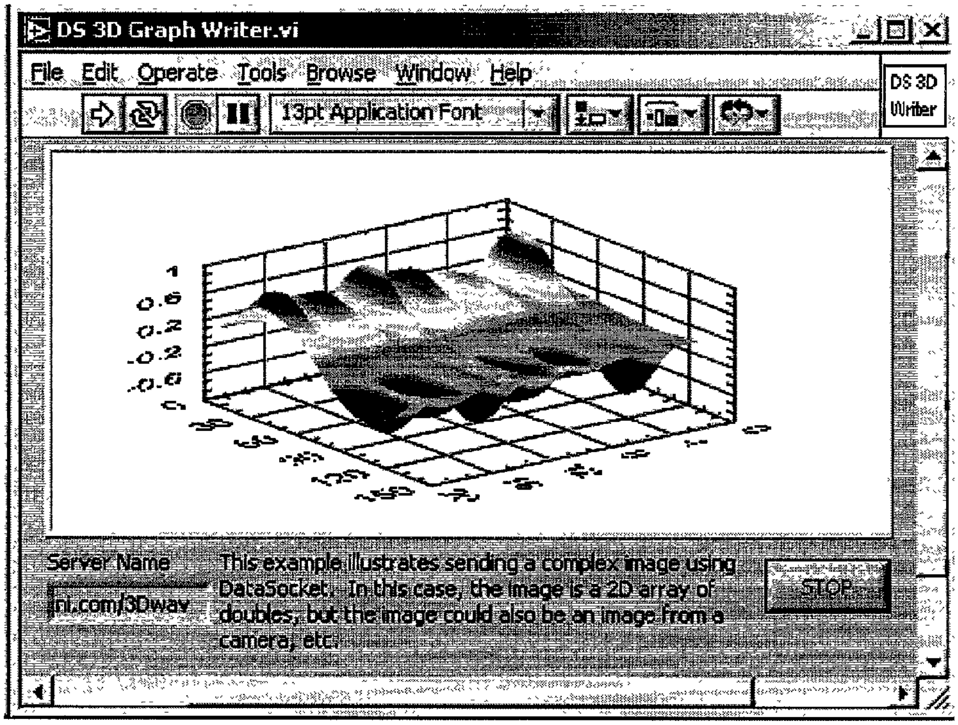
FIGS. 23–24 illustrate GUI panels for a writer program and reader program, respectively, wherein the writer program displays and writes 3D waveform data to a server and the reader program receives and displays this 3D data.
Figure 24:
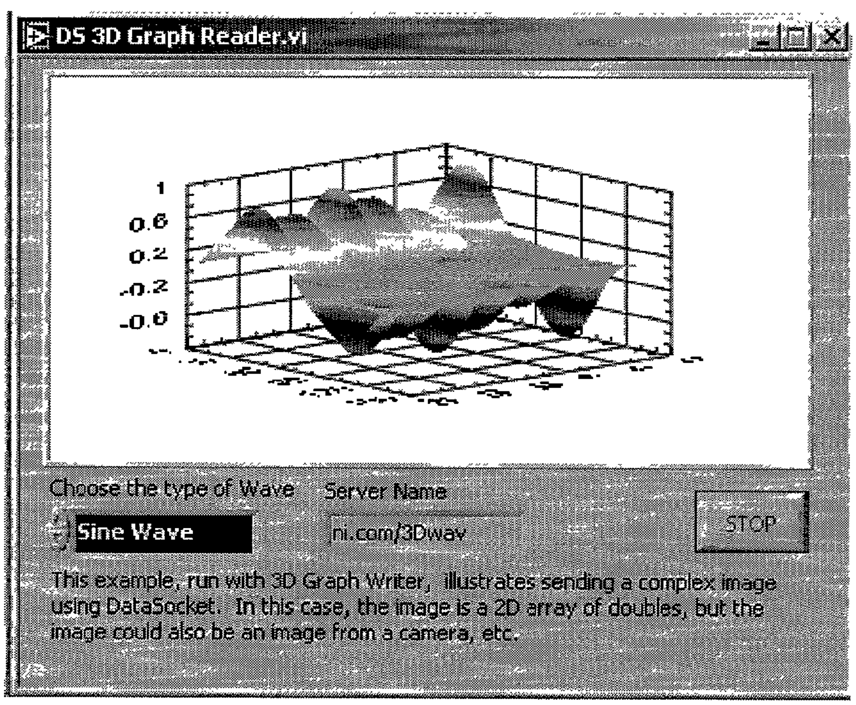

FIGS. 23–24: Three Dimensional Waveform Example

FIGS. 23–24 illustrate GUI panels for a writer program and reader program, respectively. The writer and reader program operate similarly as the writer and reader programs of FIGS. 14 and 15 described above. However, in this case the writer program displays and writes 3D waveform data to a server and the reader program receives and displays this 3D data. Also, FIGS. 23 and 24 illustrate the use of custom GUI elements. In these programs the data is displayed using a custom ActiveX control operable to display 3D waveform data.

Figure 25:
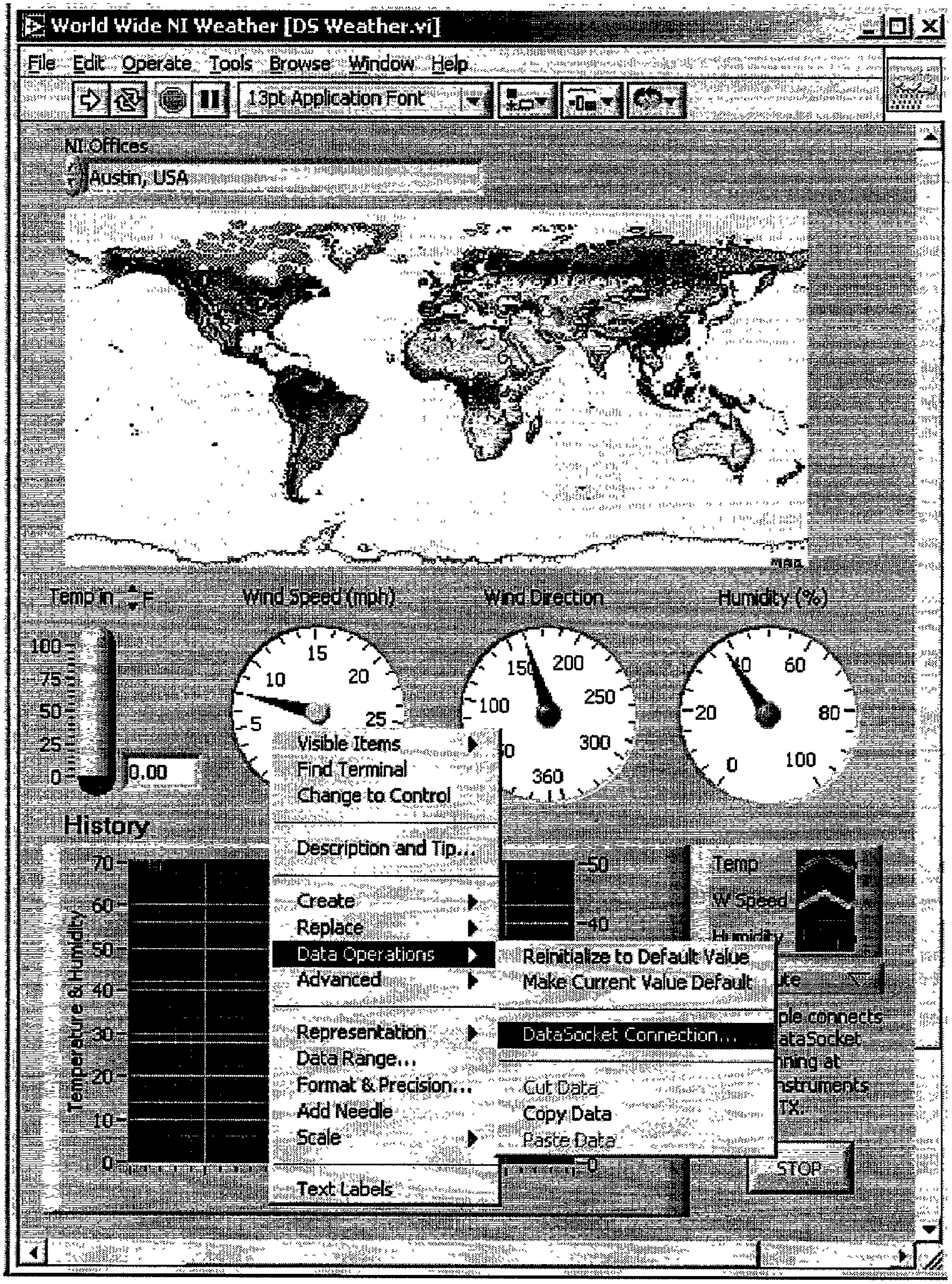
FIG. 25 illustrates a GUI panel for a program operable to receive and display live weather data, such as wind speed data, temperature data, humidity data, etc., wherein the developer displays a popup menu to configure a data connection for a GUI element on the GUI panel.

FIG. 25—Live Weather Data Example

FIG. 25 illustrates a GUI panel for a graphical program operable to receive and display live weather data, such as wind speed data, temperature data, humidity data, etc. Any or all of the GUI elements shown on the GUI panel may be configured to receive data from a data source, such as data generated by a program executing on a remote computer.

FIG. 25 illustrates a situation in which multiple GUI elements are operable to display data from a given data source. For example, in the FIG. 25 program, temperature data may be received from a first data source and wind speed data may be received from a second data source. In each case, the received data may comprise a stream of numerical data. A plurality of GUI elements operable to display numeric data may be available, including knobs, gauges, meters, etc. However, in order to create the desired user interface, it may be desirable to use a particular GUI element for each data source. For example, for the temperature data, a thermometer GUI element would be most appropriate, whereas for the wind speed data, a gauge GUI element would be most appropriate. Thus, during the development of the FIG. 25 program, the developer may have been prompted to choose among several available GUI elements for each data source and may have selected the most appropriate one in each case. Alternatively, the developer may have manually changed GUI elements automatically selected by default into new types of GUI elements, or may have first included the desired GUI elements in the program and then specified the corresponding data sources.

In FIG. 25, the developer has selected the "Wind Speed (mph)" gauge GUI element and displayed a popup menu, illustrating a menu item for invoking a dialog box for specifying or changing data connection information for the Wind Speed gauge GUI element.

As described below, one embodiment of the present invention enables multiple reader programs to receive and display data generated by a writer program, by interfacing with a server. Thus, multiple users may execute the program of FIG. 25 to view live weather data. In the prior art, creating these types of applications is typically a complicated task, but one embodiment of the present invention enables data exchange between a writer program and multiple reader programs executing in different locations to occur without the developer having to supply any source code.

Figure 26:
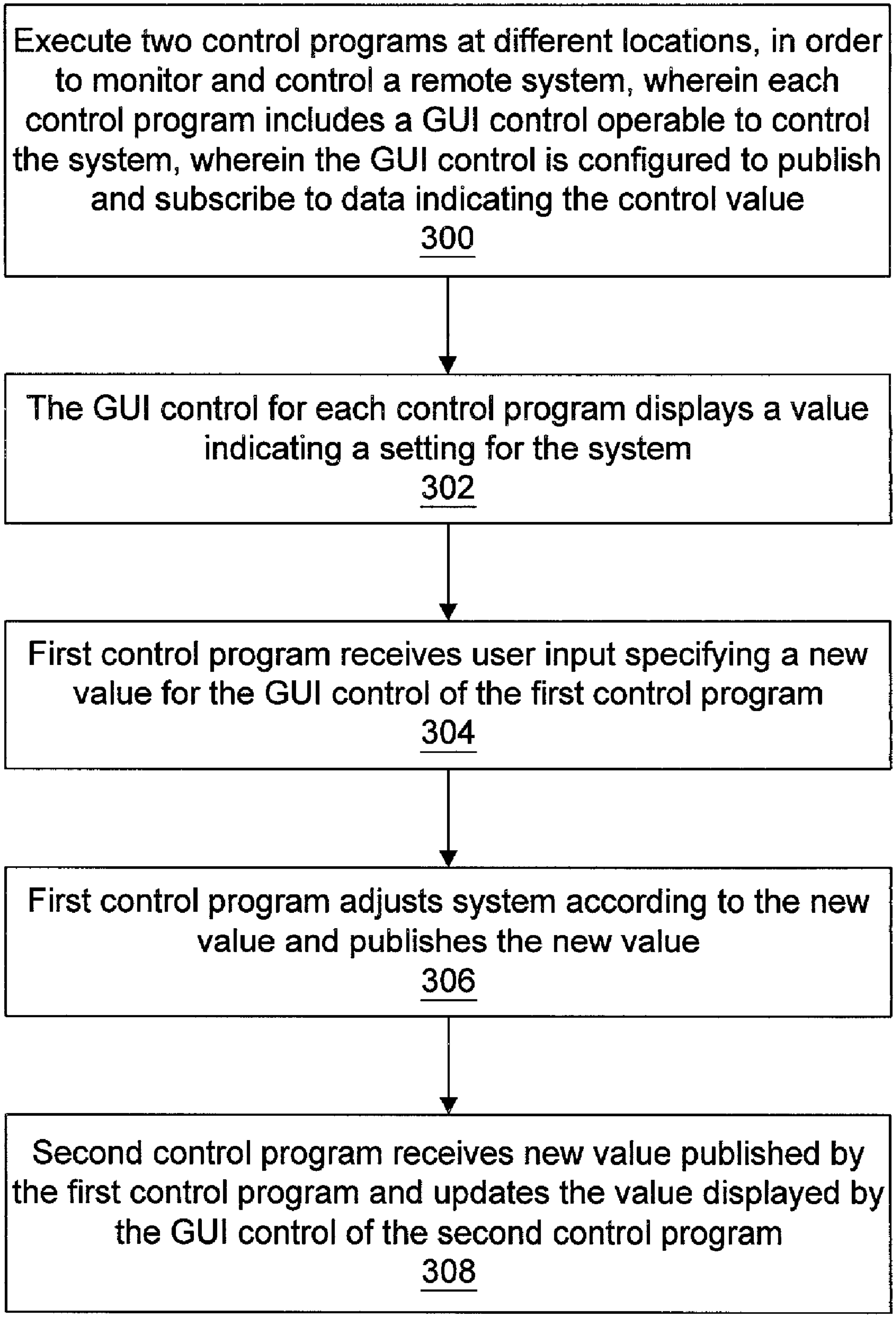
FIG. 26 is a flowchart diagram illustrating one embodiment of a method for performing two-way data exchange between two programs by configuring a GUI element in each program to publish and subscribe to a data target/source.

FIG. 26: Two-Way Exchange of Data

In the examples discussed above, a GUI element was configured to either publish data to a data target or subscribe to data from a data source. In some cases, it is desirable for a graphical program to both receive data for display in a GUI element from external data sources and provide data associated with a GUI element to external data targets. FIG. 26 is a flowchart diagram illustrating one embodiment of a method for performing this type of two-way data exchange by configuring a GUI element to publish and subscribe to a data target/source. The method of FIG. 26 illustrates an example in which two-way exchange of data is performed in order to coordinate the monitoring and control of a remote system. However, the ability to configure a GUI element to both publish and subscribe to data may be useful in many other situations.

In step 300, two graphical programs may be executed, e.g., at different locations, in order to monitor and control a remote system. Each program may have a GUI control configured to both publish and subscribe to data. For example, the programs may display a knob GUI control, such as the Frequency knob shown in the GUI of FIG. 1, configured to publish and subscribe to data. For example, consider a situation in which two control programs execute at different locations, wherein users of the control programs monitor a remote system and control the opening and closing of a valve in the remote system by turning the knob GUI control.

In step 302, the GUI control for each program may display a value indicating a setting for the system. In the example above, the knob GUI controls may display a value indicating the current state of the valve on the remote system.

In step 304, a user of one of the control programs, i.e., the "first" control program, may specify a new value for the GUI control displayed by the first control program. In the example above, the user may turn the knob GUI control of the first control program to a new value.

In step 306, the first computer program may adjust the system according to the new value. In the above example, the first computer program may adjust the remote system by sending a control signal requesting the remote system to open or close the valve controlled by the knob GUI control. Also, since the GUI control is configured to publish its data, the new value is published to the configured data target/source to which the GUI control of the first control program is configured to publish and subscribe. For example, the new value may be published to a server as described above.

The other control program, i.e., the "second" control program, may also subscribe and publish to this data source/target. Thus, in step 308, the second control program may receive the new value published by the first control program, e.g., by interfacing with the server, and may update the value displayed by the GUI control of the second control program. In the example above, the knob GUI element of the second control program may thus be automatically turned to reflect the new setting specified by the user of the first control program.

DataSocket System

As discussed above, a program with a GUI element configured with a data connection to a data source or target may utilize a separate layer or component for interfacing with the data source or target. This section provides an overview of one embodiment of such a layer, referred to as "DataSocket". For more information on the DataSocket system, please refer to the DataSocket documentation available from National Instruments Corp. or to the above-incorporated patent application titled, "DataSocket System and Method for Accessing Data Sources Using URLs".

DataSocket provides a single, unified, end-user application programming interface (API) for connecting to data from a number of sources, such as local files, files on FTP or Web servers, and data items on OPC Servers. A DataSocket application specifies the data location by using a familiar networking standard, the URL. Just as a Web browser uses a URL to connect to a Web page, a DataSocket application uses a URL to connect to data. By using an industry-standard URL, the user can quickly and easily bring data into or share data from DataSocket applications. In addition, the DataSocket Transfer Protocol connects a DataSocket application to live data by specifying a connection to a DataSocket Server. The DataSocket Server manages most of the networking tasks for the user.

With the DataSocket Server, a lightweight, stand-alone component, programs using DataSocket can broadcast live data, such as measurement data, at high rates across a network such as the Internet to multiple remote clients concurrently. These client applications use DataSocket to subscribe to the live data. Because the DataSocket Server is a stand-alone component, it simplifies network (TCP/IP) programming by automatically managing connections to clients and automatically converting data to and from the stream of bytes sent across the network. The user does not have to write the parsing code. The DataSocket Server can run on any computer on a network, which improves performance and provides security by isolating the Web connections from other applications.

Various DataSocket APIs are provided so that various types of programming environments may interface with a DataSocket Server for data exchange. For example, as shown in FIG. 18, a DataSocket node may be included in the block diagram of a graphical program.

With conventional technologies such as TCP/IP, the developer would have to write code to convert data to an unstructured stream of bytes in the broadcasting application, as well as code to parse the stream of bytes back into its original form in subscribing applications. DataSocket, however, transfers data in a self-describing format that can represent data in an unlimited number of formats, including strings, scalars, Booleans, and waveforms. The DataSocket read and write operations transparently convert data to and from the underlying byte streams, eliminating the need to write complicated parsing code. DataSocket uses a protocol referred to as the DataSocket Transport Protocol (DSTP) to send data to and receive data from a DataSocket server.

With DataSocket the data source or target name is in the form of a URL. For example, in the URL, "dstp://localhost/wave", the "dstp://" indicates that the DataSocket application is connecting to a DataSocket Server using the DataSocket Transfer Protocol for live data. The "localhost" indicates that the DataSocket Server is running on the local machine; if the DataSocket Server were running on another machine, the user would replace localhost with the machine name or IP address. The "wave" is the data item name on the server. This is an arbitrary name which identifies the location of the data on the DataSocket Server. A single DataSocket Server can handle numerous data items.

Figure 27:
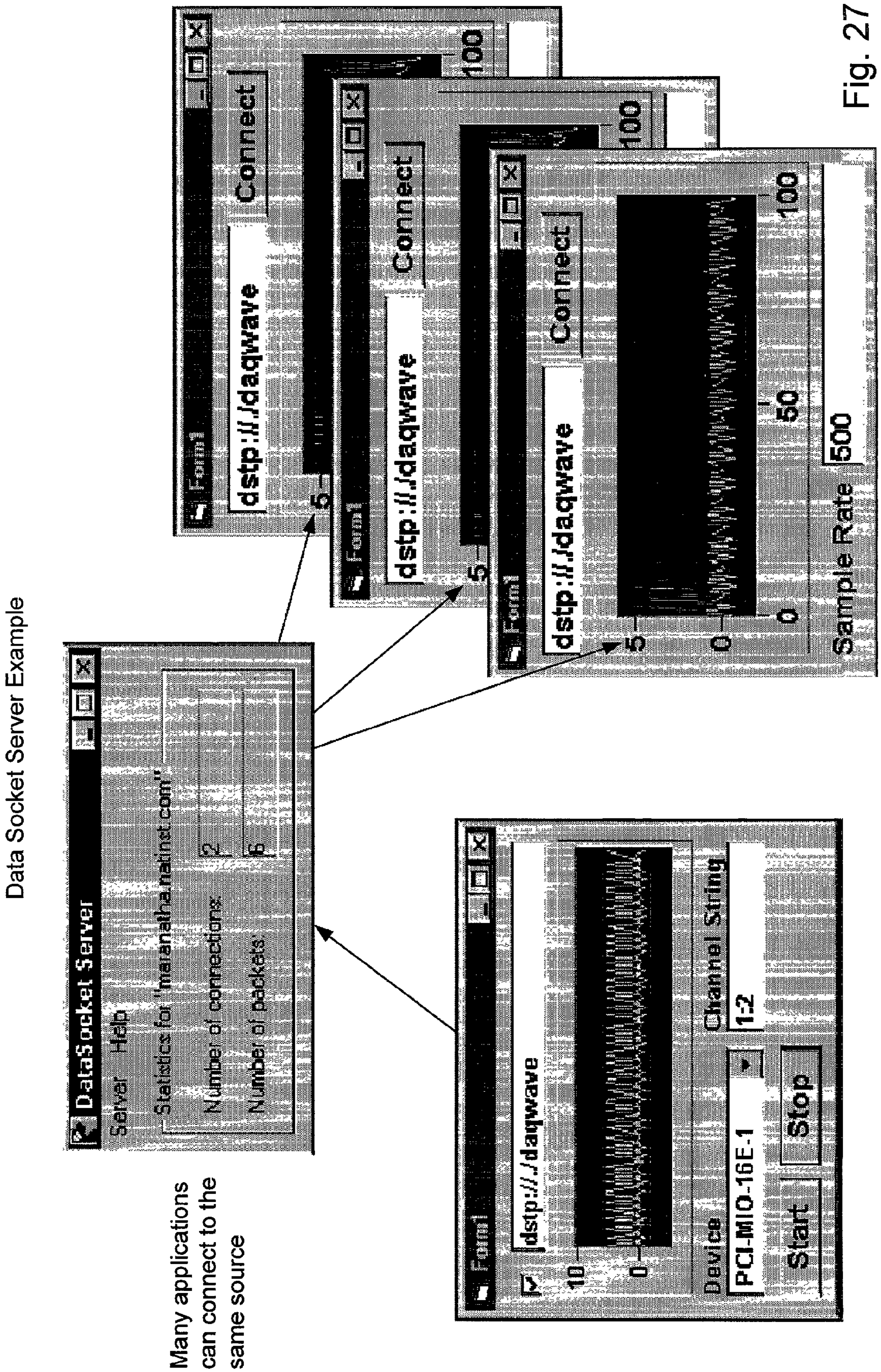
FIG. 27 illustrates an example of a DataSocket server receiving data from a single writer application and providing the data to a plurality of reader applications.

FIG. 27—DataSocket Server

FIG. 27 illustrates an example of a DataSocket server receiving data from a single writer application and providing the data to a plurality of reader applications. For example, the GUI chart elements shown in the writer and reader applications may be configured to publish data to and receive data from the DataSocket server. In the preferred embodiment, the DataSocket server by default allows multiple read (client) connections to a specific data item, but only one write connection. Thus, a developer may easily create an application in which a writer application distributes data to a plurality of clients, without having to specify source code to perform this data distribution. In the prior art, creating these types of applications is typically a complicated task.

Using the DataSocket server, the writer supplying the data is not required to handle the administrative details of sending data to many different clients, and hence can run more efficiently. The DataSocket server, which can be located on a different machine, assumes the task of redistributing the information. The user can configure the maximum number of data items and maximum number of connections allowed to the server. The user can also configure multiple write connections to a data item at the same time, if desired.

Figure 28:
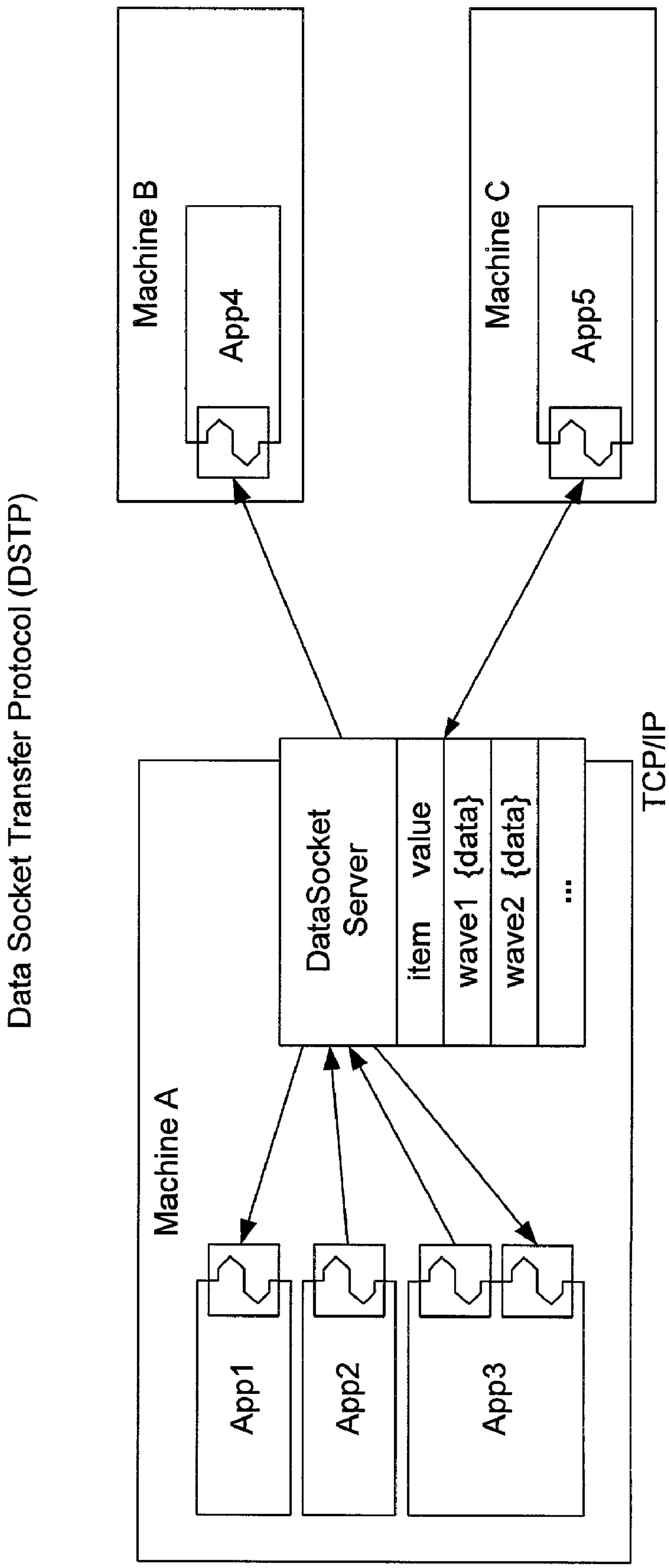
FIG. 28 is a block diagram illustrating a communication protocol referred to as the DataSocket Transport Protocol (DSTP)

FIG. 28—DataSocket Transfer Protocol

A brief description of the DataSocket Transfer Protocol as used in one embodiment follows:

Message Formats:

Messages may be made up of packets of bytes comprising the following parts.

1. [message_length] A 4-byte integer field (in little-endian) describes the length of the entire message in bytes, including the 4-byte header.
2. [message_format] A 2-byte enumeration that describes the binary format of the data in the message_data field. Types include 1, 2, 4, 8 byte integers, 4 & 8 byte floating-point numbers, ASCII and UNICODE strings. There are two special enumeration values. The first, "array", is followed by a nested message whose type field describes the array element type. The second special enumeration value "cluster" is followed by a two byte count and then by series of nested messages each describing one element of data that follows in the message_data section.
3. [message_data] Optional data in the format identified by the second field. In the case of arrays and clusters, there may be more than one value.

Message Types:

Kinds of Messages:

Messages are sent as a block of values stored in the "cluster" format described above. The first element is the op code, subsequent elements are parameters, if necessary, for the specific op code.

1. Greeting exchange, protocol version exchange.
2. Request from client to subscribe to an item maintained by the server. Items are identified by a ASCII or UNICODE string.
3. Request from client to server to cancel any existing subscription on an item
4. Request from client to server to get an item's value
5. Request from client to server to set an item's value
6. Notification from server to client of an item's value. This may be in response to a subscription or a specific request for the value.
7. Notification from server to the client that the served is being shut down.
8. Notification from client to server that it is closing the connection. (This implies canceling any subscriptions made on the connection.)

Message Opcodes:

Opcodes Used:

kCWDS_Connect,
kCWDS_Disconnect,
kCWDS_SetVersion,
kCWDS_Logon,
kCWDS_Subscribe,
kCWDS_Unsubscribe,
kCWDS_SetValue,
kCWDS_GetValue,
Message_Sequences:

Message Sequences:

Sequences:

With the exception of the greeting messages, the client, or server never waits for a reply. Either the client or server can cancel the session at any time by sending the appropriate "disconnect" message.

Protocol Functions:

Functions:

Getting, setting, and subscribing to values of items stored in a database maintained by a server.

Name of the Port:

nati-dstp

DataSocket handles all tasks of converting data and data attributes from their native application format (strings, arrays, Booleans, etc.) into a TCP/IP suitable format, referred to as the Flex Data format, and converting back from the Flex Data format on the client end. Because the DSTP network communication only requires TCP/IP support, the DataSocket can be used to share information through many different types of networks, including the Internet. The DataSocket can be used to share information between machines located on opposite sides of the world using local Internet service providers. Of course, DataSocket and the DataSocket server can be used on a local Windows network or in a single stand-alone computer.

Figure 29A:
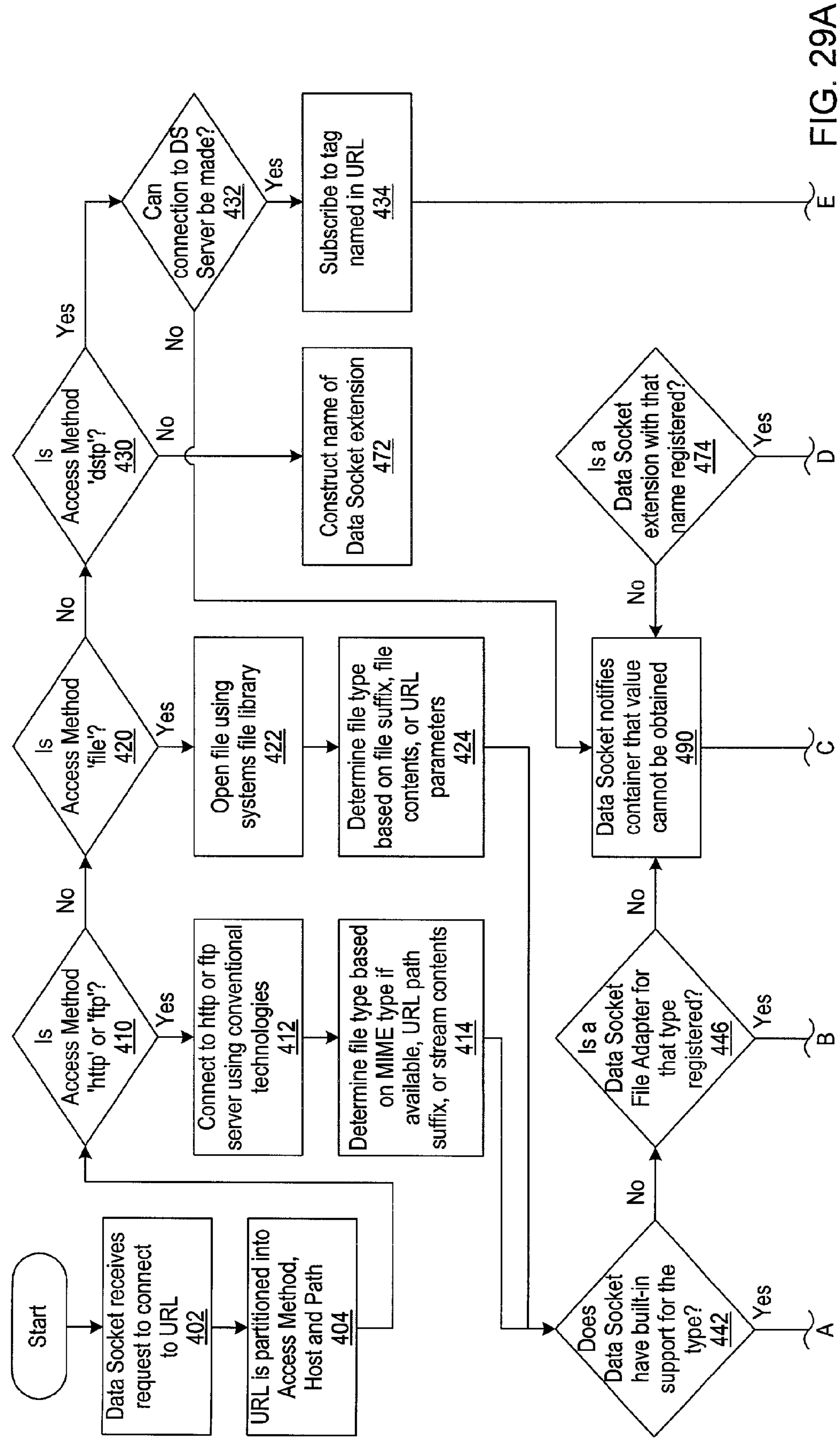
FIGS. 29A–29B are a flowchart diagram illustrating the Connect method of a DataSocket.
Figure 29B:
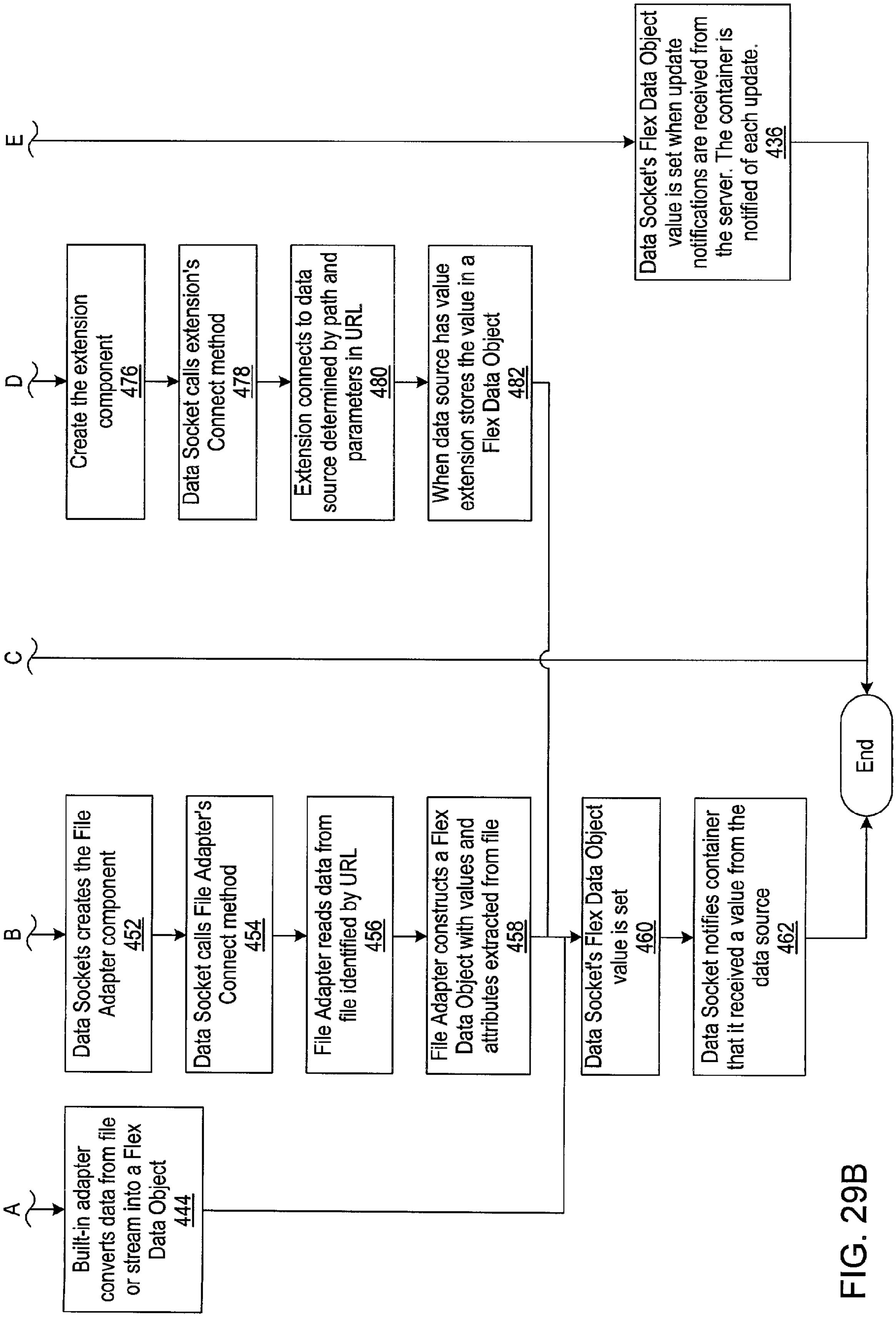

FIGS. 29A–29B: Connect Method Flowchart Diagram

FIGS. 29A–29B are a flowchart diagram illustrating the Connect method of a DataSocket according to one embodiment. It is noted that various steps in FIGS. 29A–29B may occur concurrently and/or in different orders. Also, FIGS. 29A–29B illustrate one embodiment of the DataSocket, but the DataSocket system and method may be implemented in various ways, or data may be exchanged using other techniques besides DataSocket.

As shown in step 402 the DataSocket may receive a request to connect to the specified URL. For example, the developer may have created a program with a GUI element configured to connect to a data source or target specified by the URL. When the program begins execution, the program may attempt to connect to the data source or target, e.g., by requesting the DataSocket to connect to the URL.

In step 404 the DataSocket partitions the URL into an AccessMethod, Host, and Path. The AccessMethod of the URL preferably comprises the first portion of the IRL, e.g., http, ftp, file, dstp, etc. Other AccessMethods are also contemplated. The "Host" portion specifies the host computer where the data is located, and the "Path" specifies the path where the data is located on the host computer.

If the AccessMethod is either http or ftp as determined in step 410, then in step 412 the DataSocket connects to the http or ftp server using conventional technology, e.g., using conventional Internet technology.

After step 412, in step 414 the DataSocket determines the file type. The DataSocket determines the file type for http based on the mime type. The DataSocket may also determine the file type based on the URL path suffix and/or the stream contents. After step 414, operation proceeds to step 442.

If the access method is "file" as determined in step 420, then in step 422 the DataSocket opens the file using the system's file library. In step 424 the DataSocket determines the file type based on the file suffix, the file contents, or parameters contained within the URL. After step 424, operation advances to step 442.

After the DataSocket has determined the file type in either of steps 414 or 424, in step 442 the DataSocket determines if it has built-in support for the type. If the DataSocket has built-in support for the file type as determined in step 442, then in step 444 the built-in adapter comprised in the DataSocket converts the data from the file or stream into a Flex Data object, also referred to as a FlexDataObject.

In step 444 the DataSocket converts the data into a form more usable by a typical prograrnming language or application. Examples of data converted by the DataSocket include WAV files, tabbed text files, DSD files, and text. For example, if the data is retrieved from a spreadsheet, the DataSocket converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The DataSocket preferably operates to convert data of these various formats into arrays of data or numbers for direct use by the application. After step 444, operation proceeds to step 460.

In step 460 the Flex Data object value in the DataSocket is set. This means that the data which was converted into the more usable form in step 444, such as a 2d array, is now stored in memory managed by an object that is accessible by the client program. The client application may get a copy value from the Flex Data object by calling a method on the Flex Data object named "GetValue". This method preferably returns a copy of the value stored in a VARIANT, a structure defined by Microsoft as part of its ActiveX standard for component software. The Value of attributes can be gotten by calling a method named GetAttribute, or set by calling a method called SetAttribute. A VARIANT structure is used for attributes as well. The VARIANT structure can hold simple data types like numbers or Boolean values and data types that require additional memory for storage such as strings and arrays.

In step 462 the DataSocket notifies the container or application using the DataSocket that it has received a value from the data source, preferably through a new data event. Operation then completes.

If the DataSocket does not include built-in support for the file type as determined in step 442, then in step 446 the DataSocket determines if a DataSocket file adapter is registered for that file type. A DataSocket file adapter is created by a user and registered with the DataSocket. The DataSocket file adapter is used to read or write files using custom-defined formats. If a DataSocket file adapter is not registered for that type, then in step 490 the DataSocket notifies the container or application that the value cannot be retrieved, and operation completes.

If a DataSocket file adapter is registered for that file type as determined in step 446, then in step 452 the DataSocket creates the file adapter component or client. In step 454 the DataSocket calls or invokes the file adapter's Connect method. In step 456 the file adapter reads data from the file identified by the URL. In step 458 the file adapter constructs a Flex Data object with values and attributes extracted from the file.

After steps 452–458 have been performed, in step 460 Flex Data object value in the DataSocket is set, and in step 462 the DataSocket notifies the container or application that it has received a value from the URL, and operation completes.

If the access method is "dstp" as determined in step 430, then in step 432 the DataSocket attempts to make a connection to the DataSocket server identified by the URL using the host name or Internet address encoded in the URL according to standard URL syntax. As described above, the access mode "dstp" directs the DataSocket to connect to the DataSocket server identified in the URL. If the connection is established in step 432, then in step 434 the DataSocket sends a command indicating a request to subscribe to a specific tag or item, or to write the value of a specific tag maintained by the DataSocket server. The DataSocket preferably sends this command over TCP/IP. If the specific tag does not exist on the server, then the server may create the tag and give it an initial value, or may report back an error indicating that that the requested tag does not exist. This is a configuration option on the DataSocket server. Reporting errors is preferably done by sending commands over the TCP/IP connection. Commands are preferably sequences of bytes sent over a TCP/IP connection.

After step 434, as updates are received in step 436, the DataSocket sets the value in the DataSocket's Flex Data object and notifies the container or application using the DataSocket. Thus, each time update notifications are received from the server, the Flex Data object is set and the container or application is notified of each update. Step 436 is continually performed as data is received until the container instructs the DataSocket to disconnect from the data source to which it is connected.

If the access method is not "dstp" as determined in step 430, and is not either http, ftp, or file as determined in steps 410 and 420, then in step 472 the DataSocket derives or constructs the name of an extension or plug-in from the access method that was specified in the URL. For example, if the access method is "opc" then the name of the extension or plug-in could be "DataSocketPlugIn_opc".

In step 474 the DataSocket determines if a DataSocket extension or plug-in with that name is registered. Thus, if the access method is not one of the pre-defined types, e.g., http, ftp, file, or dstp, in steps 472 and 474 the DataSocket attempts to intelligently determine the proper extension or plug-in from the access method that was specified in the URL.

If no DataSocket plug-in is registered with the derived name, then the DataSocket notifies the application or container that the value cannot be retrieved, and operation completes.

If a DataSocket plug-in is registered for the determined extension name as determined in step 474, then steps 476–482 are performed.

In step 476 the DataSocket creates an extension component based on the registered DataSocket extension. In other words, the DataSocket instantiates a component from the registered DataSocket extension.

In step 478 the DataSocket calls the extension component's Connect method. In step 480 the extension or plug-in connects to the data source determined by the path and parameters in the URL. In step 482, when the data source has a value, the extension stores the value in a Flex Data object and operation then advances to 460. As discussed above, in steps 460 and 462 the DataSocket's Flex Data object value is set and the DataSocket notifies the container that it has received a value from the data source, and operation then completes.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for configuring a graphical user interface (GUI) element to display data during execution of a graphical program, the method comprising:

receiving user input specifying a data source, wherein the user input is received to a block diagram of the graphical program, wherein the block diagram comprises a plurality of connected nodes, wherein the connected nodes visually represent functionality of the graphical program, and wherein the data source is external to the graphical program, and wherein the data source is not represented by a node in the block diagram;

automatically displaying a GUI element in a graphical user interface of the graphical program; and automatically configuring the GUI element to receive and indicate data from the specified data source during execution of the graphical program;

wherein said automatically displaying and said automatically configuring are performed based on the user input specifying the data source.

2. The method of claim 1, wherein the GUI element is automatically configured to receive and indicate data from the specified data source without user programming.

3. The method of claim 1, further comprising:

automatically determining an appropriate GUI element to display, based on the specified data source;

wherein said automatically displaying a GUI element comprises automatically displaying the determined GUI element.

4. The method of claim 3, further comprising:

receiving data from the data source in response to the user input specifying the data source;

wherein said determining an appropriate GUI element to display comprises automatically analyzing the received data and automatically determining a GUI element operable to indicate the received data.

5. The method of claim 4, wherein the data is received in a self-describing format;

wherein said automatically determining a GUI element operable to indicate the received data comprises automatically determining a GUI element operable to indicate data of the self-described format.

6. The method of claim 1, wherein said receiving user input specifying the data source comprises receiving user input in response to a drag-and-drop user interface technique personnel by the user.

* * * * *